US012079242B2

(12) United States Patent
Banerjee et al.

(10) Patent No.: US 12,079,242 B2
(45) Date of Patent: Sep. 3, 2024

(54) DYNAMICALLY SCALING APPLICATION AND STORAGE SYSTEM FUNCTIONS BASED ON A HETEROGENEOUS RESOURCE POOL AVAILABLE FOR USE BY A DISTRIBUTED STORAGE MANAGEMENT SYSTEM

(71) Applicant: NetApp, Inc., San Jose, CA (US)

(72) Inventors: Arindam Banerjee, Fremont, CA (US); Daniel McCarthy, Erie, CO (US); Christopher Cason, Boulder, CO (US); Ananthan Subramanian, San Ramon, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/047,774

(22) Filed: Oct. 19, 2022

(65) Prior Publication Data
US 2023/0121460 A1    Apr. 20, 2023

Related U.S. Application Data

(60) Provisional application No. 63/257,465, filed on Oct. 19, 2021.

(51) Int. Cl.
*G06F 17/00* (2019.01)
*G06F 16/27* (2019.01)

(52) U.S. Cl.
CPC .................. *G06F 16/27* (2019.01)

(58) Field of Classification Search
CPC ....................................................... G06F 16/27
See application file for complete search history.

(56) References Cited

U.S. PATENT DOCUMENTS 7,409,511 B2    8/2008    Edwards et al.
7,958,168 B2    6/2011    Chen et al.
(Continued)

FOREIGN PATENT DOCUMENTS

EP         1369772        12/2003
WO      2021050875         3/2021

OTHER PUBLICATIONS

Sage A. Weil, Scott A. Brandt, Ethan L. Miller, Darrell D. E. Long, and Carlos Maltzahn. 2006. Ceph: a scalable, high-performance distributed file system. In Proceedings of the 7th symposium on Operating systems design and implementation (OSDI '06). USENIX Association, USA, 307-320. November (Year: 2006).*

(Continued)

*Primary Examiner* — Greta L Robinson
(74) *Attorney, Agent, or Firm* — Jaffery Watson Hamilton & DeSanctis LLP

(57) ABSTRACT

Systems and methods for scaling application and/or storage system functions of a distributed storage system based on a heterogeneous resource pool are provided. According to one embodiment, the distributed storage system has a composable, service-based architecture that provides scalability, resiliency, and load balancing. The distributed storage system includes a cluster of nodes each potentially having differing capabilities in terms of processing, memory, and/or storage. The distributed storage system takes advantage of different types of nodes by selectively instating appropriate services (e.g., file and volume services and/or block and storage management services) on the nodes based on their respective capabilities. Furthermore, disaggregation of these services, facilitated by interposing a frictionless layer (e.g., in the form of one or more globally accessible logical disks) therebetween, enables independent and on-demand scaling of either or both of application and storage system functions
(Continued)

within the cluster while making use of the heterogeneous resource pool.

44 Claims, 9 Drawing Sheets

(56) References Cited

U.S. PATENT DOCUMENTS

| | | | |
|---|---|---|---|
| 7,979,402 B1 | 7/2011 | Hamilton et al. | |
| 8,086,603 B2 | 12/2011 | Nasre et al. | |
| 8,671,265 B2 | 3/2014 | Wright | |
| 8,903,761 B1 | 12/2014 | Zayas et al. | |
| 8,903,830 B2 | 12/2014 | Edwards | |
| 9,003,021 B2 | 4/2015 | Wright et al. | |
| 9,407,433 B1* | 8/2016 | Sohi | H04L 63/06 |
| 9,846,539 B2 | 12/2017 | Babu et al. | |
| 10,311,019 B1 | 6/2019 | Mjendra et al. | |
| 10,459,806 B1 | 10/2019 | He et al. | |
| 10,970,259 B1 | 4/2021 | Bono et al. | |
| 11,341,099 B1 | 5/2022 | Wolfson et al. | |
| 11,755,627 B1* | 9/2023 | Puente | G06F 16/26 707/737 |
| 11,868,656 B2 | 1/2024 | Dronamraju et al. | |
| 2005/0114594 A1 | 5/2005 | Corbett et al. | |
| 2011/0202705 A1 | 8/2011 | Hayashi et al. | |
| 2012/0023385 A1 | 1/2012 | Scouarnec et al. | |
| 2012/0310892 A1 | 12/2012 | Dam et al. | |
| 2013/0227145 A1 | 8/2013 | Wright et al. | |
| 2014/0237321 A1 | 8/2014 | Gold | |
| 2015/0244795 A1 | 8/2015 | Cantwell et al. | |
| 2016/0202935 A1 | 7/2016 | Hoch et al. | |
| 2016/0350358 A1 | 12/2016 | Patel et al. | |
| 2017/0026263 A1 | 1/2017 | Gell et al. | |
| 2018/0314725 A1 | 11/2018 | Subramanian et al. | |
| 2019/0147069 A1 | 5/2019 | Ben Dayan et al. | |
| 2020/0097404 A1 | 3/2020 | Cason | |
| 2020/0117362 A1 | 4/2020 | McCarthy et al. | |
| 2020/0117372 A1 | 4/2020 | Corey et al. | |
| 2020/0136943 A1* | 4/2020 | Banyai | H04L 45/70 |
| 2021/0081292 A1 | 3/2021 | Jmt et al. | |
| 2021/0124645 A1 | 4/2021 | Chinthekindi et al. | |
| 2021/0349853 A1 | 11/2021 | Duttagupta et al. | |
| 2021/0349859 A1 | 11/2021 | Bafna et al. | |
| 2022/0391359 A1 | 12/2022 | Dronamraju et al. | |
| 2022/0391361 A1 | 12/2022 | Subramanian et al. | |
| 2023/0367517 A1 | 11/2023 | Dronamraju et al. | |
| 2023/0367746 A1 | 11/2023 | Dronamraju et al. | |
| 2023/0393787 A1 | 12/2023 | Dronamraju et al. | |

OTHER PUBLICATIONS

Containers as a Service. Bring Data Rich Enterprise Applications to your Kubernetes Platform [online]. Portworx, Inc. 2021, 8 pages [retrieved on Nov. 9, 2021]. Retrieved from the Internet: ">"https://portworx.com/containers-as-a-service/.

Containers vs. Microservices: What's The Difference? [online]. BMC, 2021, 19 pages [retrieved on Nov. 9, 2021]. Retrieved from the Internet: ">" title="Link: https://www.bmc.com/blogs/containers-vs-microservices/>">https://www.bmc.com/blogs/containers-vs-microservices/.

Docker vs Virtual Machines (VMs) : A Practical Guide to Docker Containers and VMs [online]. Jan. 16, 2020. Weaveworks, 2021, 8 pages. [retrieved on 2021-11-09]. Retrieved from the Internet: ">" title="Link: https://www.weave. works/blog/a-practical-guide-to-choosing-between-docker-containers-and-vms>">https://www.weave. works/blog/a- practical-guide-to-choosing-between-docker-containers-and-vms.

Joshi A., "From there to here, from here to there, Containers are Everywhere!," Dec. 16, 2020 [online], Nutanix. Dev, 2021, 14 pages [Retrieved on Nov. 9, 2021], Retrieved from the Internet: URL: "title=" Link: https://www.nutanix.dev/2020/12/16/from-there-to-here-from-here-to-there-containers-are-everywhere/>>https://www.nutanix. dev/2020/12/16/from-there-to-here-from-here-to-there-containers-are-everywhere/.

Karbon Kubernetes Orchestration. Management Made Simple. [online]. Nutanix, 2021, 12 pages [retrieved on Nov. 9, 2021]. Retrieved from the Internet: ">">https://www.nutanix.com/products/karbon.

Kralj M., "How to Orchestrate the Modern Cloud with Kubernetes," Jul. 2020, Software Engineering Blog, retrieved from the Internet at: https://www.accenture.com/US-en/blogs/software-engineering-blog/kralj-orchestrate-modern-cloud-kubernetes, 7 pages.

NetApp SolidFire Element OS User Guide for Element OS Version 10.0, Sep. 2017, 215-12504_A0, 160 pages.

ONTAP 9, Concepts, Jun. 2021, 215-11959_2021-06_en-US, 38 pages.

ONTAP 9, Disks and Aggregates Power Guide, Jul. 2021, 215-11204_2021-07_en-US, 54 pages.

ONTAP 9, Replication between NetApp Element Software and ONTAP, May 2021, 215-12645_2021-05_en-US, 23 pages.

ONTAP 9, System Administration Reference, Jul. 2021, 15-11148_2021-07_en-US, 150 pages.

Pods [online]. Kubernetes, 2021, 6 pages [retrieved on Nov. 9, 2021]. Retrieved from the Internet: ">" title="Link: https://kubernetes.io/docs/concepts/workloads/pods/>">https://kubernetes.io/docs/concepts/workloads/pods/.

Portworx Data Services, the Complete Solution for Deploying Production-Grade Data Services on Kubernetes. [online]. Portworx, Inc. 2021, 5 pages. [Retrieved on Nov. 11, 2021]. Retrieved from the Internet: ">">https://portworx.com/products/portworx-data-services/.

Portworx Enterprise is the Complete Kubernetes Storage Platform Trusted in Production by the Global 2000 [online]. Portworx, Inc. 2021, 10 pages [Retrieved on Nov. 9, 2021]. Retrieved from the Internet: ">">https://portworx.com/products/portworx-enterprise/.

Sanglaji M., et al., "Nutanix Karbon: Enterprise-grade Kubernetes Solution," Nov. 28, 2018, 5 pages [online]. [retrieved on Nov. 9, 2021]. Retrieved from the Internet: >https://www.nutanix.com/blog/nutanix-karbon-enterprise-grade-kubernetes-solution.

Screen Captures from YouTube Video Clip Entitled "Pure Storage Portworx Deep Dive," 5 pages, Uploaded on Nov. 6, 2020 by User "Tech Field Day". Retrieved from the Internet: >https://www.youtube.com/watch?V=WTCI98RAbZg.

Software Defined Storage (SDS) Solutions. [online]. Trustradius, 2021, 14 pages [Retrieved on Nov. 9, 2021]. Retrieved from the Internet: ">" title="Link: https://www.trustradius.com/software-defined-storage-sds>">https://www.trustradius.com/software-defined-storage-sds.

Software-defined Storage. [online] IBM, 2021, 12 pages [retrieved on Nov. 9, 2021]. Retrieved from the Internet: ">">https://www.ibm.com/it-infrastructure/software-defined-storage.

Solution Brief. Easily Operate a Database-as-a-Service Platform. [online]. Portworx, Inc. 2021, 2 pages [retrieved on Nov. 9, 2021]. Retrieved from the Internet: ">">https://portworx.com/wp-content/uploads/2021/09/pds-solution-brief.pdf.

What Is Container Orchestration, Exactly? Everything to Know [online]. LaunchDarkly, Apr. 28, 2021, 8 pages. [retrieved on Nov. 9, 2021] . Retrieved from the Internet: ">">https://launchdarkly.com/blog/what-is-container-orchestration-exactly-everything/.

What is Container Orchestration? [online]. CapitalOne, 2021, 8 pages [retrieved on Nov. 9, 2021]. Retrieved from the Internet: ">" title="Link: https://www.capitalone.com/tech/cloud/what-is-container-orchestration/>">https://www. capitalone.com/tech/cloud/what-is-container-orchestration/.

GitHub., "Stork—Storage Orchestration Runtime for Kubernetes," Libopenstorage/Stork, 2022, pp. 1-14. Retrieved from the Internet: https://github.com/libopenstorage/stork.

Portworx., "Portworx Releases STORK, An Open-Source Kubernetes Scheduler Extender to Add Additional Capabilities for Stateful Applications in Production," GlobeNewswire, 2018, pp. 1-6. Retrieved from the Internet: https://www.globenewswire.com/en/news-release/2018/01/31/1329233/0/en . . . —Additional-Capabilities-for-Stateful-Applications-in-Production.html.

(56) References Cited

OTHER PUBLICATIONS

Portwrox., "Introducing STORK: Intelligent Storage Orchestration for Kubernetes," STORK, 2018, pp. 1-10. Retrieved from the Internet: https://portworx.com/blog/stork-storage-orchestration-kubernetes/.

Tanase C.D., "Portworx—Brief Introduction—k8s Persistent Storage, Mobility, Backup, DR Made Easier," Backup and Restore of Kubernetes Containers, 2021, pp. 1-5. Retrieved from the Internet: https://www.linkedin.com/pulse/portworx-brief-introduction-k8s-persistent-storage-dr-calin.

Extended European Search Report for Application No. EP22177676 mailed on Nov. 10, 2022, 10 pages.

Non-Final Office Action mailed on Dec. 7, 2023 for U.S. Appl. No. 17/449,760, filed Oct. 1, 2021, 10 pages.

Non-Final Office Action mailed on Mar. 15, 2023 for U.S. Appl. No. 17/449,753, filed Oct. 1, 2021, 8 pages.

Notice of Allowance mailed on Aug. 31, 2023 for U.S. Appl. No. 17/449,753, filed Oct. 1, 2021, 7 pages.

Notice of Allowance mailed on Nov. 8, 2023 for U.S. Appl. No. 17/449,758, filed Oct. 1, 2021, 8 pages.

Portworx., "Guarantee Your Cloud Native Success with the Portworx Data Services Platform for Kubernetes," Pure Storage, 2 pages. Retrieved from the Internet: https://portworx.com/platform/.

Production-Grade Container Orchestration [online]. Kubernetes, 2021, 6 pages [retrieved on Nov. 9, 2021]. Retrieved from the Internet: https://kubernetes.io/.

Restriction Requirement mailed Jun. 16, 2023 for U.S. Appl. No. 17/449,758, filed Oct. 1, 2021, 6 pages.

* cited by examiner

DYNAMICALLY SCALING APPLICATION AND STORAGE SYSTEM FUNCTIONS BASED ON A HETEROGENEOUS RESOURCE POOL AVAILABLE FOR USE BY A DISTRIBUTED STORAGE MANAGEMENT SYSTEM

CROSS-REFERENCE TO RELATED PATENTS

This application claims the benefit of priority to U.S. Provisional Application No. 63/257,465 filed on Oct. 19, 2021, which is hereby incorporated by reference in its entirety for all purposes.

FIELD

Various embodiments of the present disclosure generally relate to distributed storage systems. In particular, some embodiments relate to managing data using nodes having software disaggregated data management and storage management subsystems or layers, thereby facilitating scaling of application and storage system functions based on a heterogeneous resource pool.

BACKGROUND

A distributed storage system typically includes a cluster including various nodes and/or storage nodes that handle providing data storage and access functions to clients or applications. A node or storage node is typically associated with one or more storage devices. Any number of services may be deployed on the node to enable the client to access data that is stored on these one or more storage devices. A client (or application) may send requests that are processed by services deployed on the node.

SUMMARY

Systems and methods are described for scaling application and/or storage system functions of a distributed storage system based on a heterogeneous resource pool. According to one embodiment, a new node is added to a cluster from a heterogeneous resource pool that is available for use by the cluster. The cluster represents a distributed storage system and includes multiple nodes. Based on resource capacity of the new node, a configuration of the new node may be established that is indicative of whether one or both of a new storage management subsystem (SMS) and a new data management subsystem (DMS) are to be enabled on the new node. The new node is deployed virtually in accordance with the configuration. The new SMS and the new DMS are disaggregated from each other such that either the new SMS or the new DMS may operate independently within the new node or both the new SMS and the new DMS may operate within the new node. Other features of embodiments of the present disclosure will be apparent from accompanying drawings and detailed description that follows.

BRIEF DESCRIPTION OF THE DRAWINGS

The present disclosure is best understood from the following detailed description when read with the accompanying figures.

Figure 1:
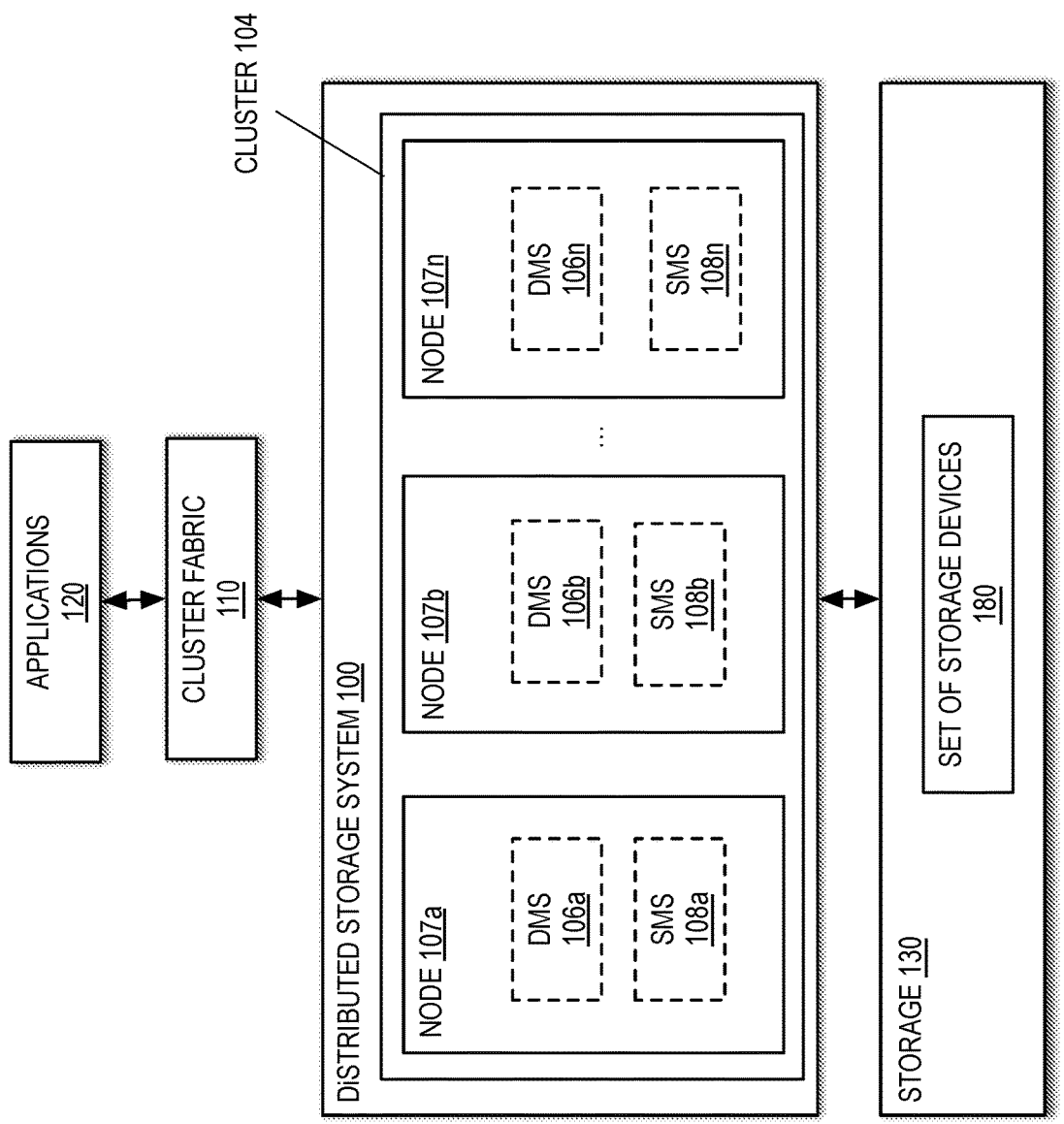
FIG. 1 is a block diagram illustrating an example of a distributed storage system in accordance with one or more embodiments.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

Systems and methods are described for scaling application and/or storage system functions of a distributed storage system based on a heterogeneous resource pool. The demands on data center infrastructure and storage are changing as more and more data centers are transforming into private clouds. Storage solution customers are looking for solutions that can provide automated deployment and lifecycle management, scaling on-demand, higher levels of resiliency with increased scale, and automatic failure detection and self-healing. A system that can scale is one that can continue to function when changed with respect to capacity, performance, and the number of files and/or volumes. A system that is resilient is one that can recover from a fault and continue to provide service dependability. Further, customers are looking for hardware agnostic systems that provide load balancing and application mobility for a lower total cost of ownership.

Traditional data storage solutions may be challenged with respect to scaling and workload balancing. For example, existing data storage solutions may be unable to increase in scale while also managing or balancing the increase in workload. Further, traditional data storage solutions may be challenged with respect to scaling and resiliency. For example, existing data storage solutions may be unable to increase in scale reliably while maintaining high or desired levels of resiliency.

Thus, various embodiments described herein include methods and systems for managing data storage using a distributed storage system having a composable, service-based architecture that provides scalability, resiliency, and load balancing. The distributed storage system may include a cluster of nodes in which each node is configured in accordance with its respective capabilities/attributes/characteristics/capacities (e.g., in terms of compute, memory, and/or storage). In one embodiment, the distributed storage system is fully software-defined such that the distributed storage system is hardware agnostic. For example, the distributed storage system may be packaged as one or more containers and can run on any server class hardware that runs a Linux operating system with no dependency on the Linux kernel version. The distributed storage system may be deployable on an underlying container orchestration platform or framework (e.g., Kubernetes), inside a Virtual Machine (VM), or run on baremetal Linux.

Existing distributed storage systems do not reliably scale as the number of clients and client objects (e.g., files, directories, etc.) scale. Some existing deployment models for distributed storage systems include the integration of a distributed file system on multiple specialized storage appliances. Alternatively, storage solution vendors may provide software-only solutions that may be installed on a limited set of validated hardware configurations (e.g., servers available from specific hardware vendors and having standardized configurations including the number and capacity of storage drives, number of central processing units (CPUs), number of CPU cores, memory capacity, and the like). A more flexible approach would be desirable to accommodate the use of a heterogeneous resource pool that, depending upon the particular operating environment (e.g., a public cloud environment vs. an on-premise environment), may include worker nodes, VMs, physical servers representing a variety of different capabilities or capacities in terms of compute, memory, and/or storage, and/or JBODs representing a variety of different storage capacities.

Thus, the various embodiments described herein also include methods and systems for allowing the distributed storage system to take advantage of the types of nodes from a heterogeneous resource pool that are made available to it by selectively instating appropriate services on the nodes based on their respective capabilities. For example, file and volume services may be instantiated on nodes having certain processing (e.g., CPU, CPU core) and/or memory (e.g., DRAM) capacities and block and storage management services may be instantiated on nodes having certain storage capacity (e.g., drives or storage resources). In this manner, the distributed storage system may scale either or both of application and storage system functions while making use of a heterogeneous resource pool.

Further, the embodiments described herein provide a distributed storage system that can scale on-demand, maintain resiliency even when scaled, automatically detect node failure within a cluster and self-heal, and load balance to ensure an efficient use of computing resources and storage capacity across a cluster. The distributed storage system may have a composable service-based architecture that provides a distributed web scale storage with multi-protocol file and block access. The distributed storage system may provide a scalable, resilient, software defined architecture that can be leveraged to be the data plane for existing as well as new web scale applications.

A given instance of a node of the distributed storage system may include one or both of a data management subsystem (DMS) and a storage management subsystem (SMS) based on a dynamic configuration established for the given node. For example, a node may include a DMS that is disaggregated from an SMS such that the DMS operates separately from and independently of, but in communication with, the SMS of the same node or of one or more SMSs running on a different node within the cluster. The DMS and the SMS are two distinct systems, each containing one or more software services. The DMS performs file and data management functions, while the SMS performs storage and block management functions. In one or more embodiments, the DMS and the SMS may each be implemented using different portions of a Write Anywhere File Layout (WAFL®) file system. For example, the SMS may include a first portion of the functionality enabled by a WAFL file system and the SMS may include a second portion of the functionality enabled by a WAFL file system. The first portion and the second portion are different, but in some cases, the first portion and the second portion may partially overlap. This separation of functionality via two different subsystems contributes to the disaggregation of the DMS and the SMS.

Disaggregating the DMS from the SMS, which includes a distributed block persistence layer and a storage manager, may enable various functions and/or capabilities. The DMS may be deployed on the same physical node as the SMS, but the decoupling of these two subsystems enables the DMS to scale according to application needs, independently of the SMS. For example, the number of instances of the DMS may be scaled up or down independently of the number of instances of the SMS within the cluster. Further, each of the DMS and the SMS may be spun up independently of the other. The DMS may be scaled up per application needs (e.g., multi-tenancy, QoS needs, etc.), while the SMS may be scaled per storage needs (e.g., block management, storage performance, reliability, durability, and/or other such needs, etc.).

Still further, this type of disaggregation may enable closer integration of the DMS with an application layer and thereby, application data management policies such as application-consistent checkpoints, rollbacks to a given checkpoint, etc. For example, this disaggregation may enable the DMS to be run in the application layer or plane in proximity to the application. As one specific example, an instance of the DMS may be run on the same application node as one or more applications within the application layer and may be run either as an executable or a statically or dynamically linked library (stateless). In this manner, the DMS can scale along with the application.

A stateless entity (e.g., an executable, a library, etc.) may be an entity that does not have a persisted state that needs to be remembered if the system or subsystem reboots or in the event of a system or subsystem failure. In one embodiment, the DMS is stateless in that the DMS does not need to store an operational state about itself or about the data it manages anywhere. Thus, the DMS can run anywhere and can be restarted anytime as long as it is connected to the cluster network. The DMS can host any service, any interface (or logical interface (LIF)) and any volume that needs processing capabilities. The DMS does not need to store any state information about any volume. If and when required, the DMS is capable of fetching the volume configuration information from a cluster database. Further, the SMS may be used for persistence needs.

The disaggregation of the DMS and the SMS allows exposing clients or application to file system volumes but allowing them to be kept separate from, decoupled from, or otherwise agnostic to the persistence layer and actual storage. For example, the DMS exposes file system volumes to clients or applications via an application layer, which allows the clients or applications to be kept separate from the SMS and thereby, the persistence layer. For example, the clients or applications may interact with the DMS without ever being exposed to the SMS and the persistence layer and how they function. This decoupling may enable the DMS and at least the distributed block layer of the SMS to be independently scaled for improved performance, capacity, and utilization of resources. The distributed block persistence layer may implement capacity sharing effectively across various applications in the application layer and may provide efficient data reduction techniques such as, for example, but not limited to, global data deduplication across applications.

The particular approach for implementing software disaggregation of the SMS and the DMS may involve different packaging/implementation choices including the use of a single container for a file system instance including both the SMS and the DMS or the use of multiple containers for the file system instance in which a first set of one or more containers may include the SMS and a second set of one or more containers may include the DMS. In the former scenario, the various services of the SMS and/or the DMS to be brought up may be represented in the form of processes and the processes to be spun up or launched for a given file system instance may be determined based on a configuration of the file system instance. As described further below, the configuration of the given file system instance may be determined dynamically based on the resource capacity (e.g., compute, storage, and/or memory capacity) of the particular node (e.g., a new node added to the cluster from a heterogeneous resource pool).

In one or more embodiments, the SMSs and DMSs deployed on nodes represent instances of block and storage management services and file and volume services, respectively.

As described above, the distributed storage system enables scaling and load balancing via mapping of a file system volume managed by the DMS to an underlying distributed block layer (e.g., comprised of multiple node block stores) managed by the SMS. While the file system volume is located on one node having a DMS, the underlying associated data and metadata blocks may be distributed across multiple nodes having SMSs within the distributed block layer. The distributed block layer may be thin provisioned and is capable of automatically and independently growing to accommodate the needs of the file system volume. The distributed storage system provides automatic load balancing capabilities by, for example, relocating (without a data copy) of file system volumes and their corresponding objects in response to events that prompt load balancing.

Further, the distributed storage system is capable of mapping multiple file system volumes (pertaining to multiple applications) to the underlying distributed block layer with the ability to service I/O operations in parallel for all of the file system volumes. Still further, the distributed storage system enables sharing physical storage blocks across multiple file system volumes by leveraging the global dedupe capabilities of the underlying distributed block layer.

Resiliency of the distributed storage system may be enhanced by leveraging a combination of block replication (e.g., for node failure) and RAID (e.g., for drive failures within a node). Still further, recovery of local drive failures may be optimized by rebuilding from RAID locally and without having to resort to cross-node data block transfers. Further, the distributed storage system may provide auto-healing capabilities. Still further, the file system data blocks and metadata blocks are mapped to a distributed key-value store that enables fast lookup of data In this manner, the distributed storage system described herein provides various capabilities that improve the performance and utility of the distributed storage system as compared to traditional data storage solutions. The distributed storage system is further capable of servicing I/Os in an efficient manner even with its multi-layered architecture. For example, improved performance may be provided by reducing network transactions (or hops), reducing context switches in the I/O path, or both.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Example Distributed Storage System

Referring now to the figures, FIG. 1 is a block diagram illustrating an example of a distributed storage system 100 in accordance with one or more embodiments. In one or more embodiments, distributed storage system 100 is implemented at least partially virtually. Distributed storage system 100 includes a cluster 104 of nodes (e.g., nodes 107a-n). As described further below, various services, including one or both of a distributed management system (DMS) (e.g., DMSs 106a-n) and a storage management system (SMS) (e.g., SMSs 108a-n) may be implemented within the respective nodes. In the context of the present example, the DMSs and SMSs are shown with a dashed outline to indicate they are optional subsystems that may or may not be present on a given node.

Storage 130 associated with the distributed storage system 100 may include multiple storage devices that are at the same geographic location (e.g., within the same datacenter, in a single on-site rack, inside the same chassis of a storage node, etc. or a combination thereof) or at different locations (e.g., in different datacenters, in different racks, etc. or a combination thereof). Storage 130 may include disks (e.g., solid state drives (SSDs)), disk arrays, non-volatile random-access memory (NVRAM), one or more other types of storage devices or data storage apparatuses, or a combination thereof. In some embodiments, storage 130 includes one or more virtual storage devices such as, for example, without limitation, one or more cloud storage devices.

Nodes 107a-n may include a small or large number of nodes. In some embodiments, nodes 107a-n may include 10 nodes, 20 nodes, 40 nodes, 50 nodes, 80 nodes, 100 nodes, or some other number of nodes. At least a portion (e.g., one, two, three, or more) of nodes 107a is associated with a corresponding portion of storage 130. Node 107a is one example of a node of distributed storage system 100. Node 107a may be associated with (e.g., connected or attached to and in communication with) a set of storage devices 180 of storage 103. In one or more embodiments, node 107a may include a virtual implementation or representation of a storage controller or a server, a virtual machine such as a storage virtual machine, software, or combination thereof.

In one or more embodiments, distributed storage system 100 has a software-defined architecture. In some embodiments, distributed storage system 100 is running on a Linux operating system. The distributed storage system 100 may include various software-defined subsystems (e.g., DMSs 106a-n and SMSs 108a-n) that enable disaggregation of data management and storage management functions and implemented using one or more software services. This software-based implementation enables distributed storage system 100 to be implemented virtually and to be hardware agnostic. As described further below with reference to FIG. 3, additional subsystems may include, for example, without limitation, a protocol subsystem (not shown) and a cluster management subsystem (not shown). Because the subsystems may be software service-based, one or more of the subsystems can be started (e.g., "turned on") and stopped ("turned off") on-demand. In some embodiments, the various subsystems of the distributed storage system 100 may be implemented fully virtually via cloud computing.

The protocol subsystem may provide access to nodes 107a-n for one or more clients or applications (e.g., applications 120) using one or more access protocols. For example, for file access, protocol subsystem may support a Network File System (NFS) protocol, a Common Internet File System (CIFS) protocol, a Server Message Block (SMB) protocol, some other type of protocol, or a combination thereof. For block access, protocol subsystem may support an Internet Small Computer Systems Interface (iSCSI) protocol. Further, in some embodiments, protocol subsystem may handle object access via an object protocol, such as Simple Storage Service (S3). In some embodiments, protocol subsystem may also provide native Portable Operating System Interface (POSIX) access to file clients when a client-side software installation is allowed as in, for example, a Kubernetes deployment via a Container Storage Interface (CSI) driver. In this manner, protocol subsystem functions as the application-facing (e.g., application programming interface (API)-facing) subsystem of the distributed storage system 100.

A DMS (e.g., one of DMSs 106a-n) may take the form of a stateless subsystem that provides multi-protocol support and various data management functions, including file and volume services. In one or more embodiments, the DMS includes a portion of the functionality enabled by a file system such as, for example, the Write Anywhere File Layout (WAFL®) file system. For example, an instance of the WAFL file system may be implemented to enable file services and data management functions (e.g., data lifecycle management for application data) of the DMS. Some of the data management functions enabled by the DMS include, but are not limited to, compliance management, backup management, management of volume policies, snapshots, clones, temperature-based tiering, cloud backup, and/or other types of functions.

An SMS (e.g., one of SMSs 108a-n) is resilient and scalable. The SMS may provide efficiency features, data redundancy based on software Redundant Array of Independent Disks (RAID), replication, fault detection, recovery functions enabling resiliency, load balancing, Quality of Service (QoS) functions, data security, and/or other functions (e.g., storage efficiency functions such as compression and deduplication). Further, the SMS may enable the simple and efficient addition or removal of one or more nodes to nodes 107a-n. In one or more embodiments, the SMS provides block and storage management services that enable the storage of data in a representation that is block-based (e.g., data is stored within 4 KB blocks, and inodes are used to identify files and file attributes such as creation time, access permissions, size, and block location, etc.). Like the DMS, the SMS may also include a portion of the functionality enabled by a file system such as, for example, the WAFL file system. This functionality may be at least partially distinct from the functionality enabled with respect to the DMS.

In one embodiment, the DMS is disaggregated from the SMS, which enables various functions and/or capabilities. In particular, a given DMS (e.g., DMS 106a) operates separately from or independently of the SMSs 108a-n but in communication with one or more of the SMSs. For example, the DMSs may be scalable independently of the SMSs, and vice versa. Further, this type of disaggregation may enable closer integration of the DMS with a particular application (e.g., one of applications 120) runs and thereby, can be configured and deployed with specific application data management policies such as application-consistent checkpoints, rollbacks to a given checkpoint, etc. Additionally, this disaggregation may enable the DMS to be run on the same application node as the particular application. In other embodiments, the DMS may be run as a separate, independent component within the same node as the SMS and may be independently scalable with respect to the SMS.

In one or more embodiments, a given node of nodes 107a-n may be instanced having a dynamic configuration. The dynamic configuration may also be referred to as a persona of the given node. Dynamic configuration of the given node at a particular point in time may refer to the particular grouping or combination of subsystems that are started (or turned on) at that particular point in time on the given node on which the subsystems are deployed. For example, at a given point in time, a node may be in a first configuration, a second configuration, a third configuration, or another configuration. In the first configuration, both the DMS and the SMS are turned on or deployed, for example, as illustrated by node 407b of FIGS. 4A-D. In the second configuration, a portion or all of the one or more services that make up the DMS are not turned on or are not deployed, for example, as illustrated by node 407a in FIGS. 4A-D. In the third configuration, a portion or all of the one or more services that make up the SMS are not turned on or are not deployed, for example, as illustrated by node 407c of FIGS. 4A-D. The dynamic configuration may be a configuration that can change over time depending on the needs of a client or application in association with the distributed storage system 100. For example, an application owner may add a new node (e.g., a new Kubernetes worker node, a new VM, a new physical server, or a just a bunch of disks (JBOD) system, as the case may be) from a heterogeneous resource pool (not shown) for use by the cluster of nodes 107a-n to provide additional performance and/or storage capacity in support of the application owner's desire to add a new application or in response to being notified by the distributed storage system 100 of changing application performance and/or storage characteristics over time. The availability of the new node may trigger performance of automated scaling by the distributed storage system 100 of performance and/or storage capacity based on the capabilities of the new node as described further below with reference to FIGS. 4A-D and FIG. 5.

In the context of the present example, the distributed storage system 100 is in communication with one or more clients or applications 120. In one or more embodiments, nodes 107a-n may communicate with each other and/or with applications 120 via a cluster fabric 110.

In some cases, the DMS may be implemented virtually "close to" one or more of the applications 120. For example, the disaggregation or decoupling of the DMSs and the SMSs may enable the DMS to be deployed outside of nodes 107a-n. In one or more embodiments, the DMS may be deployed within a node (not shown) on which one or more of applications 120 runs and may communicate with a given SMS over one or more communications links and using the protocol subsystem.

The various examples described herein also allow the storage fault domain (e.g., the SMS) to be disaggregated from/independent of the stateless DMS fault domain (e.g., the fault domain of the DMS), which may be the same as the application. Since the lifecycle, availability, and scaling of applications are all closely associated with the DMS, it may be beneficial to collocate them. For example, if the application goes down due to a hardware failure on its worker node, the application obviously won't be accessing the volume until the application is back up and conversely, if the volume's node goes down, so does the application.

As noted above, various embodiments described herein allow a distributed storage system (e.g., distributed storage system 100) to take advantage of the types of nodes made available to it within a heterogeneous resource pool by selectively instating appropriate services on the nodes based on their respective attributes/characteristics/capacities. Those skilled in the art will appreciate as more drive capacity becomes available for use by the distributed storage system, scaling the number of SMSs, for example, providing block and storage management services within a cluster (e.g., cluster 104) increases the total storage capacity of the cluster. The benefits of scaling the number of DMSs, for example, providing file and volume service are more complex and varied as the factors that may be constrained by the number of DMSs within the cluster and the CPU resources per DMS include the number of volumes and input/output operations per second (IOPS). As such, by increasing the number of DMSs in a cluster, more volumes may be created and/or more IOPS/GB may be added to existing volumes due to having fewer volumes per DMS. The latter translates into lower latency and higher throughput, which would thus improve application performance. The former allows for more volumes and thus more applications to be allocated to use the storage.

Since, based on the nature of the nodes that can support a DMS and the example architectures proposed herein, spinning up a new DMS can be done more quickly and cheaply than spinning up a new SMS, scaling to meet the needs of the applications can be achieved much more dynamically by being able to scale the DMS independently of the SMS. It may also be simpler to deploy and manage CPU only (stateless) nodes since when these fail, there is less to do to recover. For example, when such nodes fail, the applications and DMS instances may be spun up somewhere else within the cluster without the need for performing the healing described below.

Figure 2:
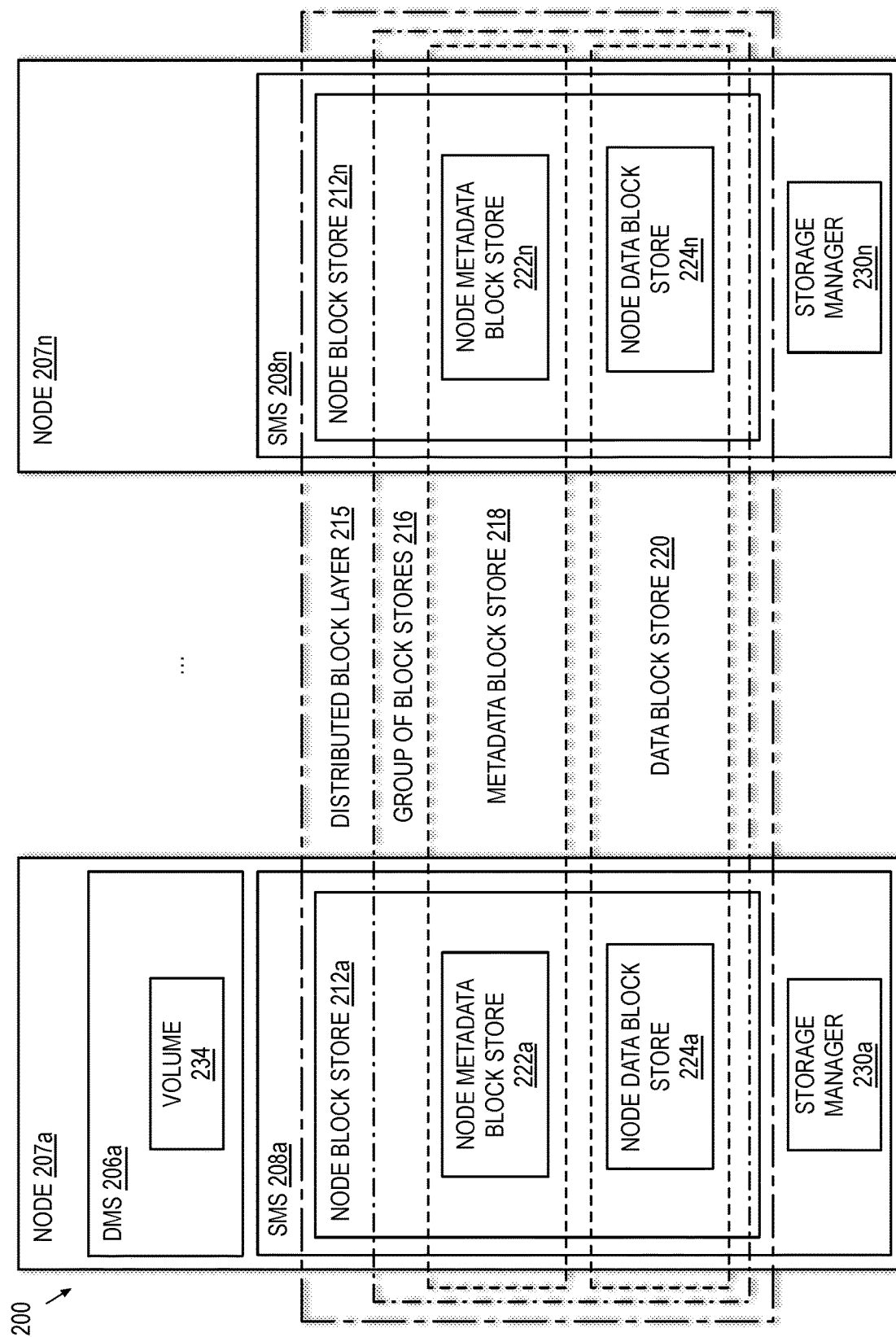
FIG. 2 is a block diagram of a distributed storage system in accordance with one or more embodiments.

FIG. 2 is a block diagram of a distributed storage system 200 in accordance with one or more embodiments. The distributed storage system 200 may be analogous to distributed storage system 100 of FIG. 1 and nodes 207a-n may be analogous to nodes 107a-n of FIG. 1. In the context of the present example, node 207a is deployed having a first configuration in which both DMS 206a (which may be analogous to DMS 106a of FIG. 1) and SMS 208a (which may be analogous to SMS 108a of FIG. 1) are deployed. Node 207n may be deployed having a second configuration in which SMS 208n (which may be analogous to SMS 108n of FIG. 1) is deployed and no DMS is deployed. One or more other systems of subsystems described with reference to FIG. 1 may also be deployed in the first or second configuration. In one or more embodiments, one or more subsystems in node 207a may be turned on and/or turned off on-demand to change the configuration of node 207a on-demand. Similarly, in one or more embodiments, one or more subsystems in node 207n may be turned on and/or turned off on-demand to change the configuration of node 207n on-demand.

SMSs 208a and 208n include respective node block stores 212a and 212n. Node block stores 212a and 212n represent two node block stores of multiple node block stores that form distributed block layer 215 of distributed storage system 200. Distributed block layer 215 is a distributed block virtualization layer (which may be also referred to as a distributed block persistence layer) that may virtualize storage 130 of FIG. 1 into a group of block stores 216 that are globally accessible by the various nodes 107a-n of FIG. 1. Each block store in the group of block stores 216 is a distributed block store that spans cluster 104 of FIG. 1. Distributed block layer 215 enables any one of nodes 107a-n in cluster 104 in FIG. 1 to access any one or more blocks in group of block stores 216.

In one or more embodiments, group of block stores 216 may include, for example, at least one metadata block store 218 and at least one data block store 220 that are distributed across the nodes 107a-n in cluster 104. Thus, metadata block store 218 and data block store 220 may also be referred to as a distributed metadata block store and a distributed data block store, respectively. In one or more embodiments, node block store 212a includes node metadata block store 222a and node data block store 224a. Node block store 212n includes node metadata block store 222n and node data block store 224n. Node metadata block store 222a and node metadata block store 222n form at least a portion of metadata block store 218. Node data block store 224a and node data block store 224n form at least a portion of data block store 220.

SMSs 208a and 208n further include respective storage managers 230a and 230n, which may be implemented in various ways. In one or more examples, each of the storage managers 230a and 230n includes a portion of the functionality enabled by a file system such as, for example, the WAFL file system, in which different functions are enabled as compared to the instance of WAFL enabled within DMS 206a. Storage managers 230a and 230n enable management of the one or more storage devices (e.g., of storage 130) associated with nodes 207a and node 207n, respectively. The storage managers 230a and 230n may provide various functions including, for example, without limitation, checksums, context protection, RAID management, handling of unrecoverable media errors, other types of functionality, or a combination thereof.

Although node block store 212a and 212n are described as being part of or integrated with SMS 208a and 208n, respectively, in other embodiments, node block store 212a and 212n may be considered separate from but in communication with the respective SMSs, together providing the functional capabilities described above.

The various file system instances associated with the DMSs (e.g., DMS 206a), SMSs 208a and 208n, and/or storage managers 230a and 230n may be parallel file systems. Each such file system instance may have its own metadata functions that operate in parallel with respect to the metadata functions of the other file system instances. In some embodiments, a given file system instance may be configured to scale to 2 billion files and may be allowed to expand as long as there is available capacity (e.g., memory, CPU resources, etc.) in the cluster.

In one or more embodiments, DMS 206a supports and exposes one or more file systems volumes (e.g., volume 234), to clients or applications (e.g., applications 120 of FIG. 1). Volume 234 may include file system metadata and file system data. The file system metadata and file system data may be stored in data blocks in data block store 220. In other words, the file system metadata and the file system data may be distributed across nodes 207a-n within data block store 220. Metadata block store 218 may store a mapping of a block of file system data to a mathematically or algorithmically computed hash of the block. This hash may be used to determine the location of the block of the file system data within distributed block layer 215.

Example Node

Figure 3:
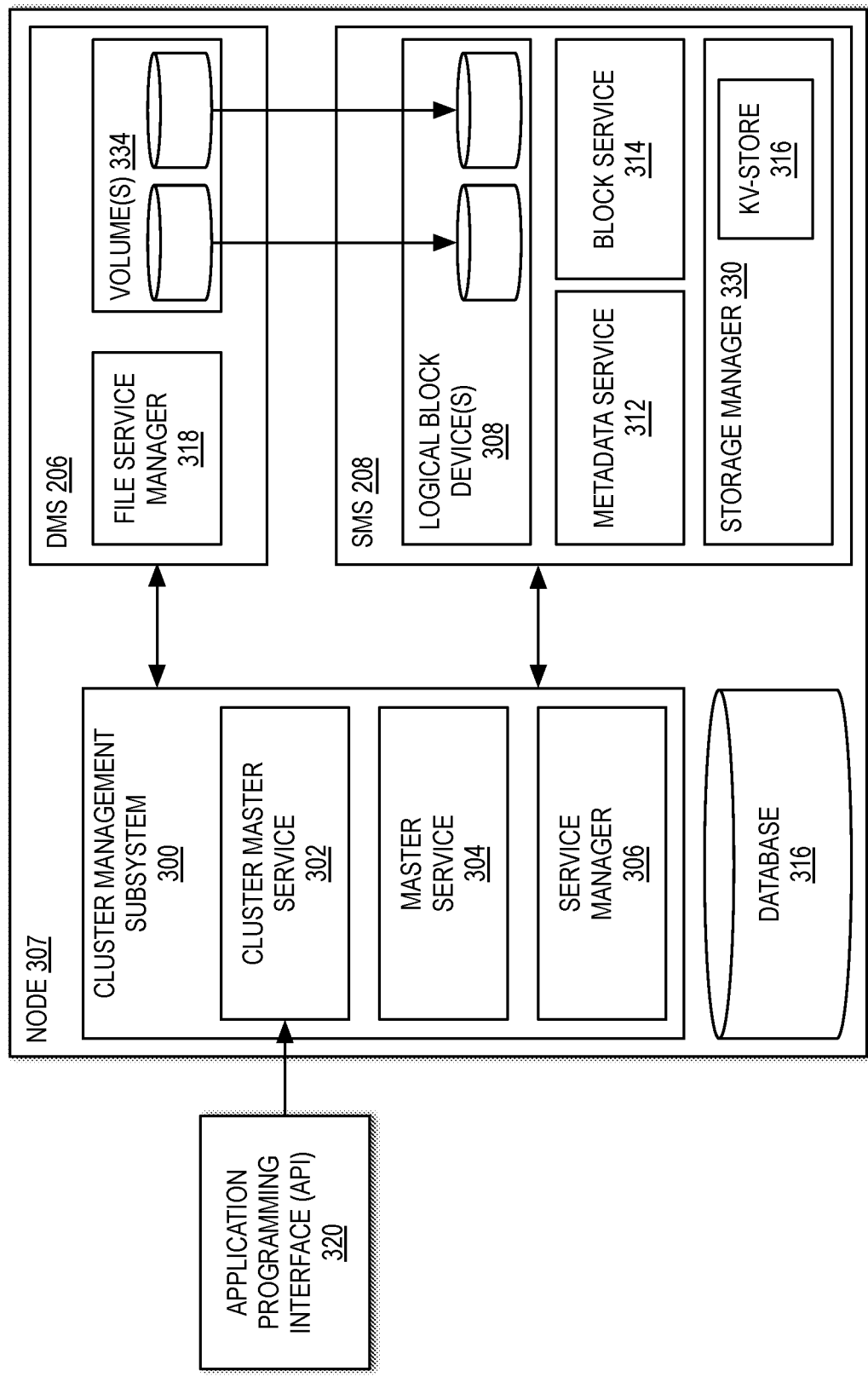
FIG. 3 is a block diagram of services deployed on node in accordance with one or more embodiments

FIG. 3 is a block diagram of services deployed on a node 307 in accordance with one or more embodiments. Node 307 may be analogous to a given node of nodes 107a-n and 207a-n. In the context of the present example, node 307 is shown including a cluster management subsystem 300, a database 316, a DMS 206, and an SMS 208. Cluster management subsystem 118 provides a distributed control plane for managing a cluster (e.g., cluster 104), as well as the addition of resources to and/or the deletion of resources from the cluster. Such a resource may be a node, a service, some other type of resource, or a combination thereof. DMS 206, SMS 208, or both may be in communication with cluster management subsystem 300, depending on the configuration. In some embodiments, cluster management subsystem 300 is implemented in a distributed manner that enables management of one or more other clusters.

In one or more embodiments, cluster management subsystem 300 includes cluster master service 302, a master service 304, a service manager 306, and/or a combination thereof. In some embodiments, cluster master service 302 may be active in only one node of the cluster at a time. Cluster master service 302 may be used to provide functions that aid in the overall management of cluster. For example, cluster master service 302 may provide various functions including, but not limited to, orchestrating garbage collection, cluster wide load balancing, snapshot scheduling, cluster fault monitoring, one or more other functions, or a combination thereof. Cluster master service 302 may perform some functions responsive to requests received via an API (e.g., API 320).

Master service 304 may be created at the time node 307 is added to the cluster. Master service 304 is used to provide functions that aid in the overall management of node 307. For example, master service 304 may provide various functions including, but not limited to, encryption key management, drive management, web server management, certificate management, one or more other functions, or a combination thereof. Further, master service 304 may be used to control or direct service manager 306.

Service manager 306 may be a service that manages the various services deployed in node 307 and memory. Service manager 306 may be used to start, stop, monitor, restart, and/or control in some other manner various services in node 307. Further, service manager 306 may be used to perform shared memory cleanup after a crash of or node 307.

DMS 206 may expose volume(s) 334 (which may represent multiple file system volumes, including volume 234) to one or more clients or applications (e.g., applications 120). The data blocks for each of file system volume of volume(s) 334 may be stored in a distributed manner across a distributed block layer (e.g., distributed block layer 215). In one or more embodiments, a given file system volume of volume(s) 334 may represent a FlexVol® volume (i.e., a volume that is loosely coupled to its containing aggregate).

In one embodiment the given file system volume is mapped (e.g., one-to-one) to a corresponding logical block device (a virtual construct) of logical block device(s) 308 of the SMS 208 so as to create a frictionless layer between the SMS 208 and the DMS 206. In one embodiment, this mapping may be via an intermediate corresponding logical aggregate (another virtual construct) (not shown), which in turn may be mapped (e.g., one-to-one) to the corresponding logical block device. Logical block device(s) 308 may be, for example, logical unit number (LUN) devices. In this manner, volume(s) 334 and logical block device(s) 308 are decoupled such that a client or application may be exposed to a file system volume of volume(s) 334 but may not be exposed to a logical block device of logical block device(s) 308.

In one or more embodiments, DMS 206 includes a file service manager 318, which may also be referred to as a DMS manager. File service manager 318 serves as a communication gateway between volume(s) 334 (which may represent multiple file system volumes, including volume 234) and cluster management subsystem 300. Further, file service manager 318 may be used to start and stop a given file system volume of volumes 334. Each file system volume of volumes 334 may be part of a file system instance.

In one or more embodiments, SMS 208 includes storage manager 330 (which may be analogous to storage manager 230a or 230n), metadata service 312, block service 314, and logical block device(s) 308. Metadata service 312 may be used to look up and manage the metadata in a node metadata block store (e.g., node metadata block store 222a). For example, metadata service 312 may communicate with key-value (KV) store 316 of storage manager 330. Storage manager 330 may use virtualized storage (e.g., RAID) to manage storage (e.g., storage 130). Metadata service 312 may store a mapping of logical block addresses (LBAs) in a given logical block device of logical block device(s) 308 to block identifiers in, for example, without limitation, a metadata object, which corresponds to or is otherwise designated for the given logical block device. The metadata object may be stored in a metadata volume, which may include other metadata objects corresponding to other logical block devices of logical block device(s) 308. In some embodiments, the metadata object represents a slice file and the metadata volume represents a slice volume. In various embodiments, the slice file is replicated to at least one other node in the cluster. The number of times a given slice file is replicated may be referred to as a replication factor.

The slice file enables the looking up of a block identifier that maps to an LBA of a given logical block device of logical block device(s) 308. KV store 316 stores data blocks as "values" and their respective block identifiers as "keys." KV store 316 may include a tree. In one or more embodiments, the tree is implemented using a log-structured merge-tree (LSM-tree). KV store 316 may use the underlying block volumes managed by storage manager 330 to store keys and values. KV store 316 may keep the keys and values separately on different files in block volumes and may use metadata to point to the data file and offset for a given key. Block volumes may be hosted by virtualized storage that is RAID-protected. Keeping the key and value pair separate may enable minimizing write amplification. Minimizing write amplification may enable extending the life of the underlying drives that have finite write cycle limitations. Further, using KV store 316 aids in scalability. KV store 316 improves scalability with a fast key-value style lookup of data. Further, because the "key" in KV store 316 is the hash value (e.g., content hash of the data block), KV store 636 helps in maintaining uniformity of distribution of data blocks across various nodes within the distributed data block store.

Further, metadata service 312 may be used to provide functions that include, for example, without limitation, compression, block hash computation, write ordering, disaster or failover recovery operations, metadata syncing, synchronous replication capabilities within the cluster and between the cluster and one or more other clusters, one or more other functions, or a combination thereof. In some embodiments, a single instance of metadata service 312 is deployed as part of a given file system instance.

In one or more embodiments, block service 314 is used to manage a node data block store (e.g., node data block store 224a). For example, block service 314 may be used to store and retrieve data that is indexed by a computational hash of the data block. In some embodiments, more than one instance of block service 314 may be deployed as part of a given file system instance. Block service 314 may provide functions including, for example, without limitation, deduplication of blocks across cluster 104, disaster or failover recovery operations, removal of unused or overwritten blocks via garbage collection operations, and other operations.

In one or more embodiments, metadata service 312 looks up a mapping of the LBA to a block identifier using a metadata object corresponding to a given logical block device of logical block device(s) 308. This block identifier, which may be a hash, identifies the location of the one or more data blocks containing the data to be read. Block service 314 and storage manager 330 may use the block identifier to retrieve the data to be read. In some embodiments, the block identifier determines that the location of the one or more data blocks is on a node in the distributed file system other than node 307. The data that is read may then be sent to the requester (e.g., a client or an application) via the DMS 206.

Database 316 may be used to store and retrieve various types of information (e.g., configuration information) about cluster 104. This information may include, for example, information about the configuration of a given node, volume 334, set of storage devices 180, or a combination thereof. Database 316 may also be referred to as a cluster database.

In one or more embodiments, an input/output (I/O) operation (e.g., for a write request or a read request that is received from a client or an application is mapped to a given file system volume of volume(s) 334. The received write or read request may reference both metadata and data, which is mapped to file system metadata and file system data in the given file system volume. In one or more embodiments, the request data and request metadata associated with a given request (read request or write request) forms a data block that has a corresponding logical block address (LBA) within a corresponding logical block device of logical block device(s) 308. In other embodiments, the request data and the request metadata form one or more data blocks of the corresponding logical block device with each data block corresponding to one or more logical block addresses (LBAs) within the corresponding logical block device.

A data block in the given logical block device may be hashed and stored in a node data block store (e.g., one of node data block stores 224a-n) based on a block identifier for the data block. The block identifier may be or may be based on, for example, a computed hash value for the data block. The block identifier further maps to a data bucket, as identified by the higher order bits (e.g., the first two bytes) of the block identifier. The data bucket, also called a data bin or bin, is an internal storage container associated with a selected node. The various data buckets in the cluster may be distributed (e.g., uniformly distributed) across the nodes to balance capacity utilization across the nodes and maintain data availability within the cluster. The lower order bits (e.g., the remainder of the bytes) of the block identifier identify the location within the node data block store of the selected node where the data block resides. In other words, the lower order bits identify where the data block is stored on-disk within the node to which it maps. This distribution across the nodes may be formed based on, for example, global capacity balancing algorithms that may, in some embodiments, also consider other heuristics (e.g., a level of protection offered by each node).

Example Dynamic Scaling of Services

Figure 4A:
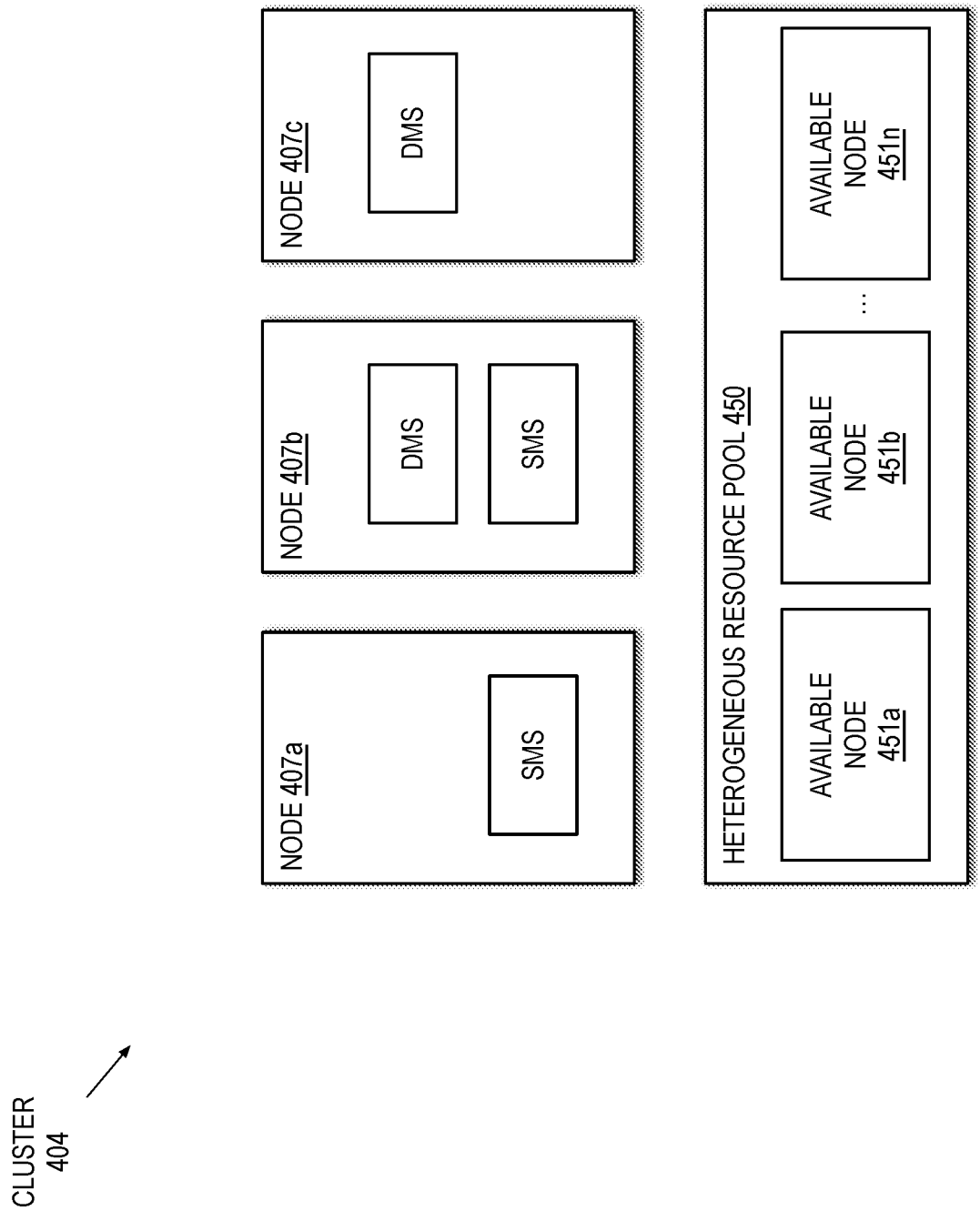
FIG. 4A is a block diagram conceptually illustrating an initial configuration of a cluster in accordance with one or more embodiments.

FIG. 4A is a block diagram conceptually illustrating an initial configuration of a cluster 404 in accordance with one or more embodiments. As previously described, a distributed storage system (e.g., distributed storage system 100) may include, among other things, a set of services on respective nodes (e.g., nodes 407a-c) of the cluster 404 (which may be analogous to cluster 104 of FIG. 1). The set of services instantiated or enabled on a given node may be based on the particular dynamic configuration (e.g., a first configuration, a second configuration, or a third configuration) established at a particular point in time in which the given node was deployed or may be changed subsequently.

In one or more embodiments, the SMSs and DMSs deployed on nodes 407a-c represent instances of block and storage management services (e.g., SMS 208) and file and volume services (e.g., DMS 206), respectively. Nodes 407a-c may be examples of nodes 107a-n cluster 104 in FIG. 1. Nodes 407a-c may have been made available for use by the distributed storage system from a heterogeneous pool of resources 450, for example, within a public cloud environment or within an on-premise environment. The heterogeneous pool of resources 450 may include a number of available nodes 451a-n. For example, an application owner may provide information to the distributed storage system via a configuration file regarding those resources within the heterogeneous resource pool 450 that are available for use by the distributed storage system. The configuration file may include identifying information (e.g., a universally unique identifier (UUID), a host name, and/or media access control (MAC) address) and/or attributes/characteristics/capacities (e.g., in terms of compute, memory, and/or storage) of the heterogeneous resources. Depending upon the particular operating environment (e.g., a public cloud environment vs. an on-premise environment), the heterogeneous pool of resources 450 may include worker nodes, VMs, physical servers representing a variety of different capabilities or capacities in terms of compute, memory, and/or storage, and/or JBODs representing a variety of different storage capacities.

In the context of the present example, cluster 404 is illustrated in an initial state in which node 407a has SMS turned on (enabled) or deployed, with DMS turned off (disabled) or not deployed (e.g., the third configuration), node 407b has both DMS and SMS turned on or deployed (e.g., the first configuration), and node 407c has DMS turned on or deployed, with SMS turned off or not deployed (e.g., the second configuration). It is to be appreciated, due to the potential heterogeneous nature of the nodes 407a-c, the SMS of node 407a may manage/control more or fewer storage devices than the SMS of node 407b.

Figure 4B:
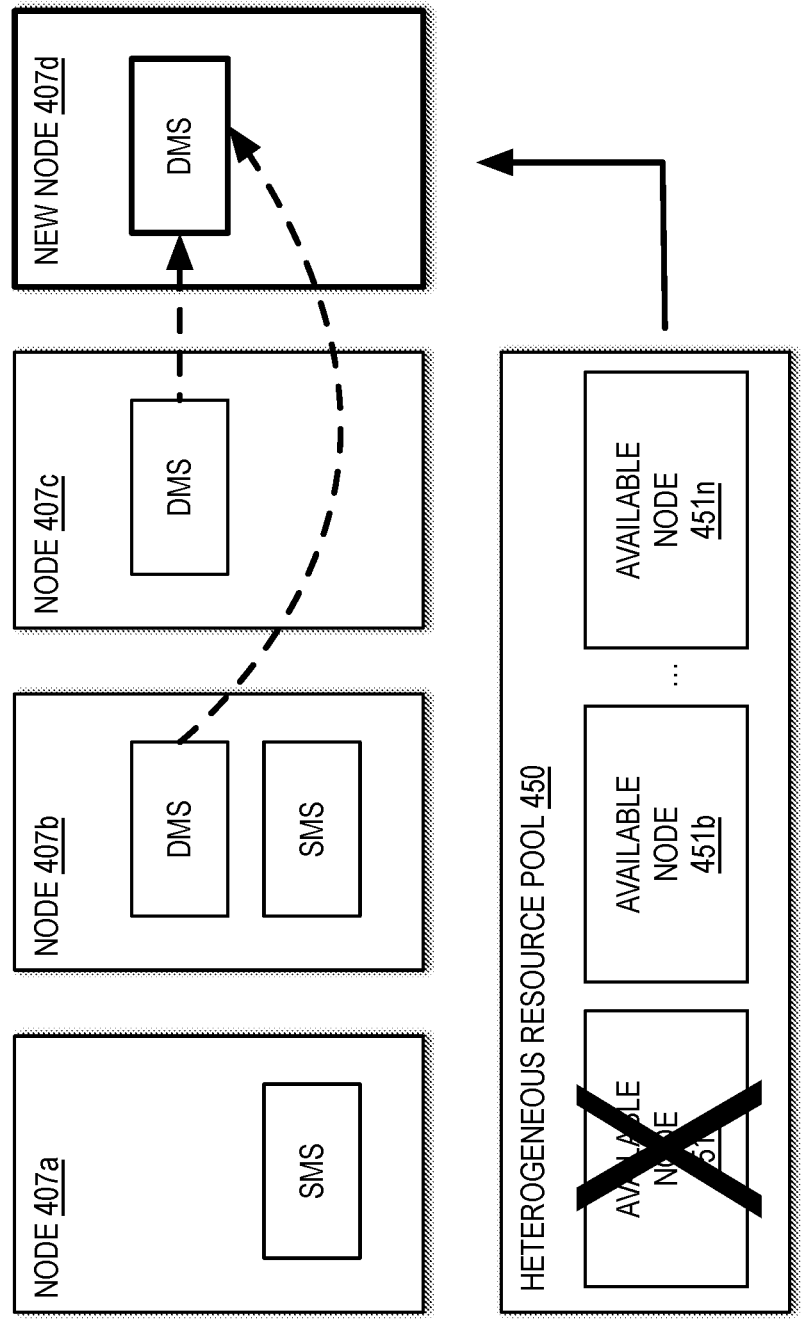
FIG. 4B is a block diagram conceptually illustrating a configuration of the cluster of FIG. 4A after the addition of a new node with compute resources and following completion of dynamic application performance scaling responsive thereto in accordance with one or more embodiments.

FIG. 4B is a block diagram conceptually illustrating a configuration of the cluster 404 of FIG. 4A after the addition of a new node with compute resources to the cluster 404 and following completion of dynamic application performance scaling responsive thereto in accordance with one or more embodiments. The present example is provided to illustrate an example of how a composable, service-based architecture of a distributed storage system (e.g., distributed storage system 100) facilitates dynamic application performance scaling. In the context of the present example, it is assumed the application owner wants to add more applications to the distributed storage system and the existing deployment does not have performance headroom for the new applications. It could also be that the performance characteristics of a given application has changed over time.

In one embodiment, the extensible design of the distributed storage system allows addition of compute resources dynamically. For example, an administrative user (e.g., a Kubernetes administrator) can add a new node 407d (e.g., a worker node) with compute resources to a heterogeneous pool of resources available for use by the distributed storge system. In this example, it is assumed the new node 407d has sufficient compute resources to enable application performance scaling to be accomplished but does not have sufficient drives or storage resources to enable storage capacity scaling to be carried out.

In one embodiment, once the new node 407d is added and connected, the distributed storage system detects the availability of the new node 407d and dynamically scales application performance by starting appropriate services (in this case, file and volume services) automatically on the new node 407d based on the capabilities of the new node 407d. Once the services are instantiated, the distributed storage system may then automatically migrate existing volumes from one or both of nodes 407b and 407c to new node 407d and/or add new volumes to new node 407d to balance the load within the cluster 404. Further details regarding an example of dynamic capacity and/or performance scaling are described below with reference to FIG. 5.

Figure 4C:
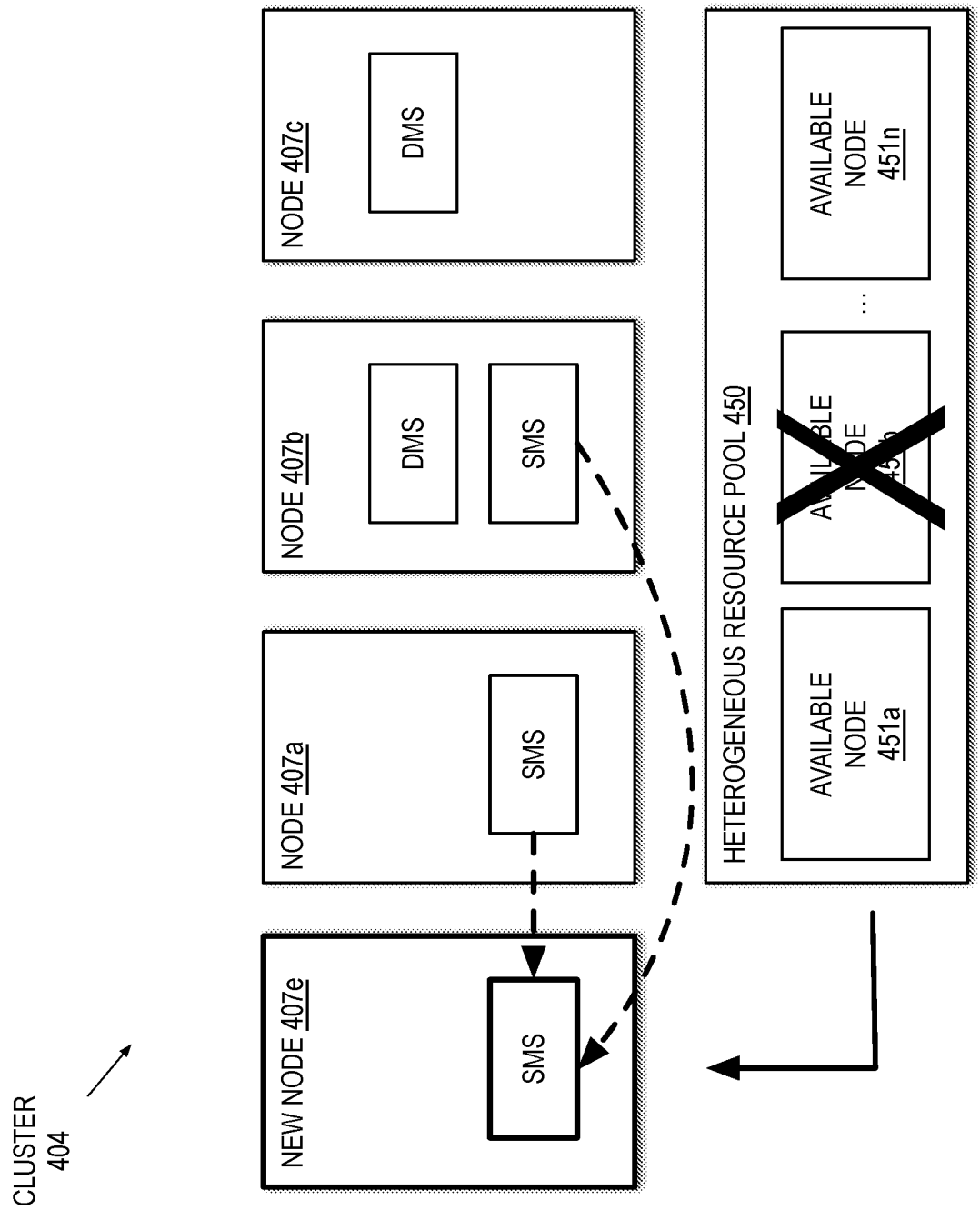
FIG. 4C is a block diagram conceptually illustrating a configuration of the cluster of FIG. 4A after addition of a new node with storage capacity to the cluster and following completion of dynamic storage capacity scaling responsive thereto in accordance with one or more embodiments.

FIG. 4C is a block diagram conceptually illustrating a configuration of the cluster 404 of FIG. 4A after addition of a new node with storage capacity to the cluster 404 and following completion of dynamic storage capacity scaling responsive thereto in accordance with one or more embodiments. The present example is provided to illustrate an example of how a composable, service-based architecture of a distributed storage system (e.g., distributed storage system 100) facilitates dynamic storage capacity scaling. In the context of the present example, it is assumed the application owner wants to add more applications to the distributed storage system and the existing deployment does not have storage capacity headroom for the new applications. It could also be that the storage usage characteristics of a given application has changed over time.

In one embodiment, the extensible design of the distributed storage system allows addition of storage resources dynamically. For example, an administrative user (e.g., a Kubernetes administrator) can add a new node 407e (e.g., a worker node) with storage resources to a heterogeneous pool of resources available for use by the distributed storage management system. In this example, it is assumed the new node 407e has sufficient storage resources to enable storage capacity scaling to be accomplished but does not have sufficient compute resources to enable application performance capacity scaling to be carried out.

In one embodiment, once the new node 407e is added and connected, the distributed storage system detects the availability of the new node 407e and dynamically scales storage capacity by starting appropriate services (in this case, block and storage management services) automatically on the new node 407e based on the capabilities of the new node 407e. Once the services are instantiated, the distributed storage system may then automatically allocate new blocks from the new node 407e and/or transfer responsibility for existing blocks, bins, and/or slices from one or both of nodes 407a and 407b to new node 407e to balance the storage capacity within the cluster 404. Further details regarding an example of dynamic capacity and/or performance scaling are described below with reference to FIG. 5.

In one embodiment, the transfer of responsibility for existing blocks, bins, and/or slices from a source node (e.g., node 407a or 407b) to a destination node (e.g., new node 407e) may avoid data movement by continuing to rely on the backing storage associated with the source node and establishing a communication channel between the source and destination nodes, for example, via a remote protocol that runs over the transmission control protocol (TCP). For example, a data container (e.g., a FlexVol) associated with a particular aggregate may be moved from the source node to the destination node while the backing storage remains on the source node.

Figure 4D:
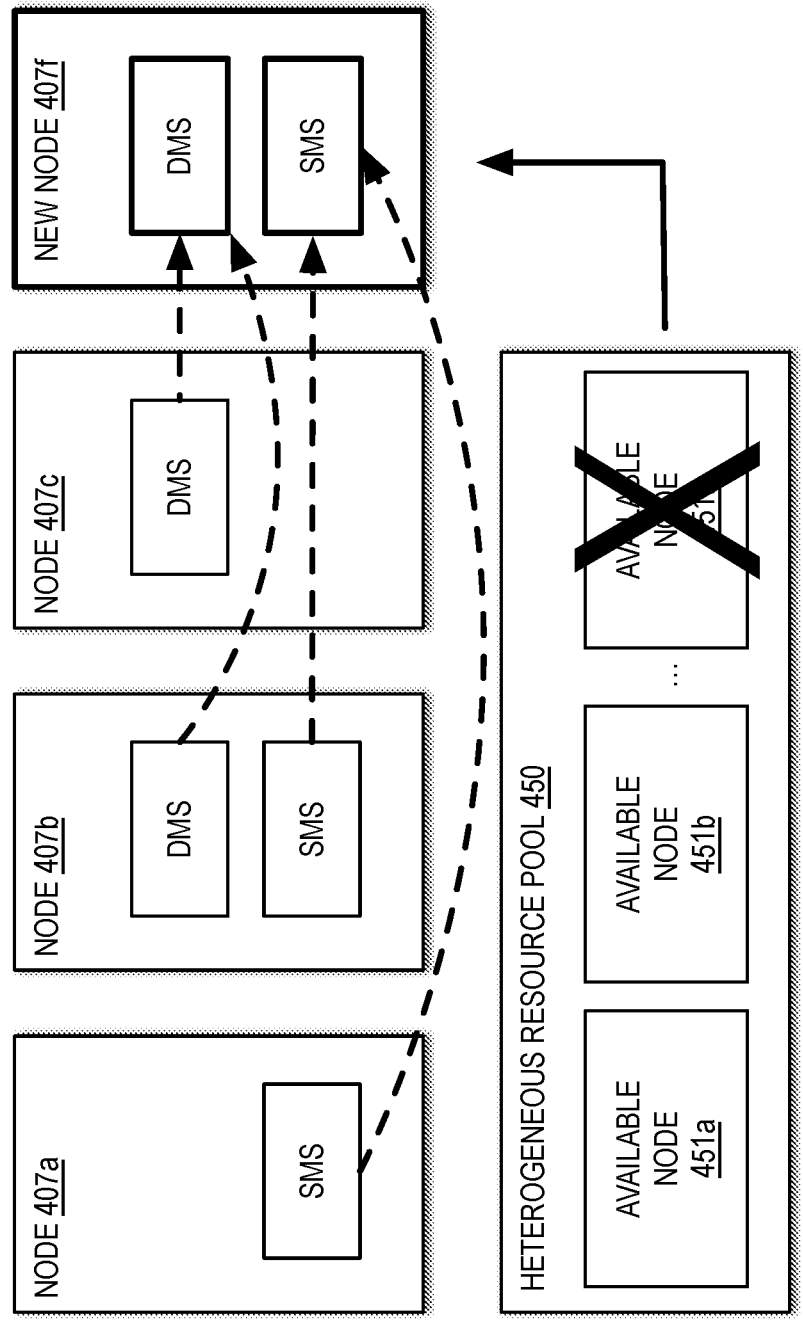
FIG. 4D is a block diagram conceptually illustrating a configuration of the cluster of FIG. 4A after addition of a new node with both compute resources and storage capacity to the cluster and following completion of dynamic application performance and storage capacity scaling responsive thereto in accordance with one or more embodiments.

FIG. 4D is a block diagram conceptually illustrating a configuration of the cluster 404 of FIG. 4A after addition of a new node with both compute resources and storage capacity to the cluster 404 and following completion of dynamic application performance and storage capacity scaling responsive thereto in accordance with one or more embodiments. The present example is provided to illustrate an example of how a composable, service-based architecture of a distributed storage system (e.g., distributed storage system 100) facilitates both application performance scaling and dynamic storage capacity scaling when sufficient resources are available on the new node 407f. In the context of the present example, it is assumed the application owner wants to add more applications to the distributed storage system and the existing deployment does not have storage capacity headroom and/or performance headroom for the new applications. It could also be that the performance characteristics and/or the storage usage characteristics of a given application have changed over time.

In one embodiment, the extensible design of the distributed storage system allows addition of both compute and storage resources dynamically. For example, an administrative user (e.g., a Kubernetes administrator) can add a new node 407f (e.g., a worker node) with both compute and storage resources to a heterogeneous pool of resources available for use by the distributed storage management system. In this example, it is assumed the new node 407f has sufficient compute and storage resources to enable both application performance and storage capacity scaling to be accomplished.

In one embodiment, once the new node 407f is added and connected, the distributed storage system detects the availability of the new node 407f and dynamically scales both application performance capacity and storage capacity by starting appropriate services (in this case, both file and volume services and block and storage management services) automatically on the new node 407f based on the capabilities of the new node 407f. Once the services are instantiated, the distributed storage system may then automatically (i) migrate existing volumes from one or both of nodes 407b and 407c to new node 407f and/or add new volumes to new node 407f to balance the load within the cluster 404 and (ii) allocate new blocks from new node 407f and/or transfer responsibility for existing blocks, bins, and/or slices from one or both of nodes 407a and 407b to new node 407f to balance the storage capacity within the cluster 404. In one embodiment, the movement of volumes from one node to another within the cluster 404 may be based on Quality of Service (QoS) aspects of the volumes. In one embodiment, rebalancing of the responsibility for existing blocks, bins, and/or slices from one node to another within the cluster 404 may be based on static attributes/characteristics/capacities associated with the nodes at issue or based on dynamically measured attributes/characteristics/capacities. A load balancing decision to initiate movement of blocks, bins, and/or slices may be performed to proportionally make use of CPUs on respective nodes of the cluster 404. For example, responsibility for portions of a global key space may be distributed across the cluster 404 in a proportional way based on the total number of CPUs represented within the cluster 404 and the number of CPUs on each node. Further details regarding an example of dynamic capacity and/or performance scaling are described below with reference to FIG. 5.

While in the above example, a worker node is used as an example of the new nodes 407d, 407e, and 407f, it is to be appreciated the new nodes 407d, 407e, and 407f may alternatively represent VMs, physical servers, or JBODs depending upon the operating environment at issue.

Additionally, although the above example is described with respect to a new node being added and discovered, for example, by the distributed storage system as a result of information regarding the new node being added to a configuration file specifying nodes of a heterogeneous resource pool 450 that are available for use by the distributed storage system, it is to be appreciated application performance scaling and/or storage capacity scaling may be carried out responsive to other changes to the heterogeneous resource pool 450 that are communicated to the distributed storage system via the configuration file. For example, an administrative user may also update the configuration file to revise attributes/characteristics/capacities (e.g., in terms of compute, memory, and/or storage) responsive to upgrading of an existing node in the heterogeneous resource pool 450 to include additional compute and/or storage resources or to reflect a desire to remove of an existing node from the heterogeneous resource pool.

Figure 5:
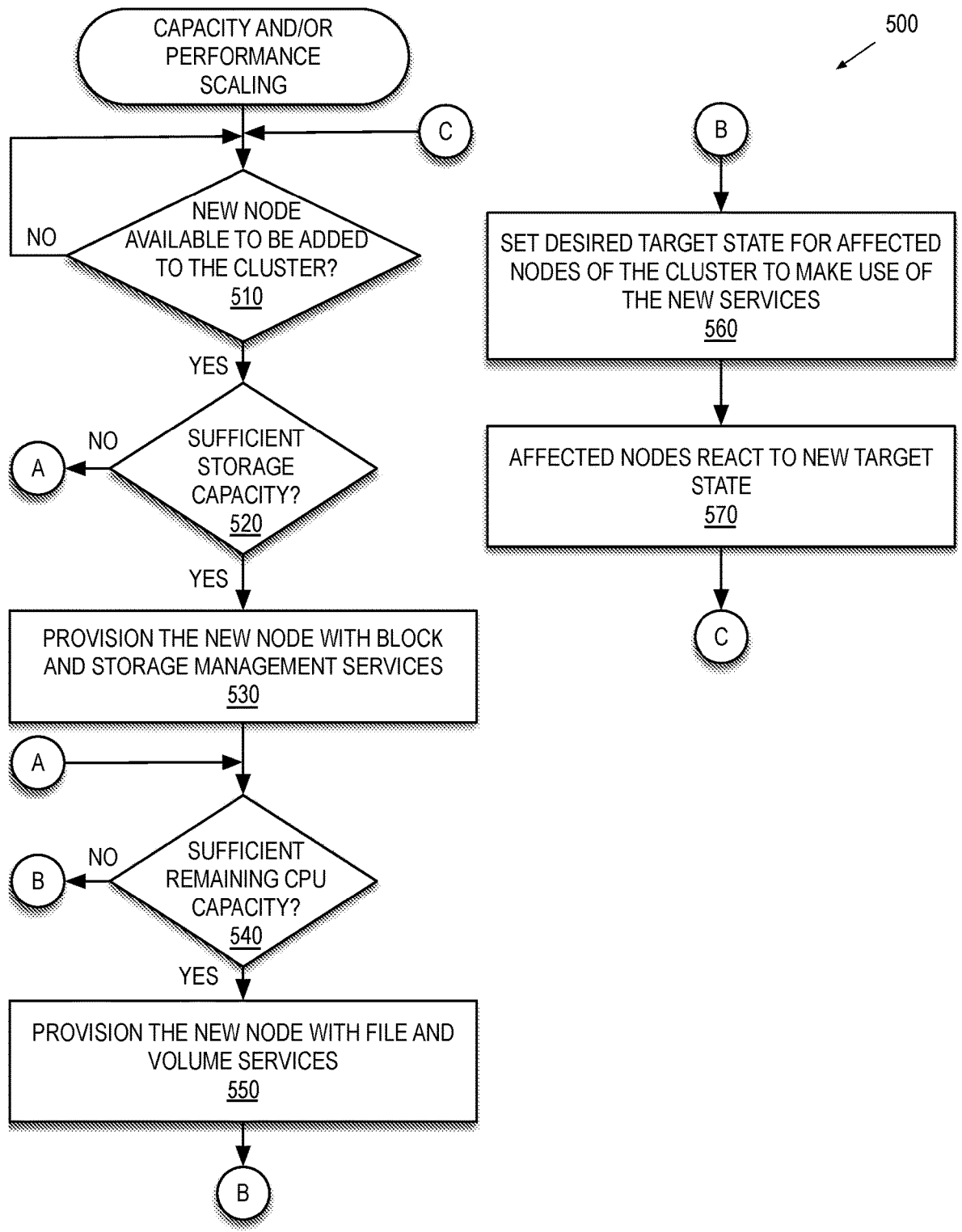
FIG. 5 is a flow diagram illustrating examples of operations in a process for automated capacity and/or performance scaling in a distributed storage system in accordance with one or more embodiments.

FIG. 5 is a flow diagram illustrating examples of operations in a process 500 for automated capacity and/or performance scaling in a distributed storage system in accordance with one or more embodiments. It is to be understood that the process 500 may be modified by, for example, but not limited to, the addition of one or more other operations. Process 500 may be implemented using, for example, without limitation, distributed storage system 100 in FIG. 1.

Process 500 begins by determining whether a new node is available (e.g., one of available nodes 451a-n) to be added to a cluster of the distributed storage system (operation 1910). The determination may be made by a distributed control plane of the distributed storage system and may be responsive, for example, to observing a change to a configuration file that contains identifying information (e.g., a universally unique identifier (UUID), a host name, and/or media access control (MAC) address) and/or attributes/characteristics/capacities (e.g., in terms of compute, memory, and/or storage) of resources within the heterogeneous resource pool that are available for use by the distributed storage system. If there is a new node that is available to be added to the cluster, for example, as indicated by the addition of a new resource to the configuration file, process 500 continues with operation 520; otherwise, process 500 loops back to operation 510. For example, the new node may represent one of new nodes 407d-f in FIGS. 4B-D.

At operation 520, it is determined whether sufficient storage capacity is available on the new node. This determination may involve evaluating whether the storage capacity of the new node accommodates, supports, or otherwise justifies provisioning the new node with block and storage management services. For example, the storage capacity may be compared against a minimum storage capacity threshold. In one embodiment, the minimum storage capacity threshold is sufficient storage capacity to form a file system aggregate. If sufficient storage capacity is determined to be available on the new node, process 500 continues with operation 530; otherwise, process 500 branches to operation 540.

At operation 530, the new node is provisioned with block and storage management services. For example, a storage management subsystem (e.g., SMS 208) may be instantiated on the new node.

At operation 540, it is determined whether sufficient remaining CPU capacity is available on the new node. This determination may take into consideration CPU capacity needed to support the provisioning, if any, of the new node with block and storage management services and an evaluation regarding whether the remaining CPU capacity of the new node accommodates, supports, or otherwise justifies provisioning the new node with file and volume services. For example, the remaining CPU capacity may be compared against a minimum CPU capacity threshold. If sufficient remaining CPU capacity is determined to be available on the new node, process 500 continues with operation 550; otherwise, process 500 branches to operation 560.

At operation 550, the new node is provisioned with file and volume services. For example, a data management subsystem (e.g., DMS 206) may be instantiated on the new node.

At operation 560, a desired target state for affected nodes of the cluster is set to make use of the new services, if any, provisioned at operations 530 and/or 550. The desired target state for each node of the cluster may be maintained by a cluster master service (e.g., cluster master service 302) within a configuration database (e.g., database 316), for example, that is accessible to and monitored by all nodes within the cluster. Alternatively, affected nodes may be notified responsive to changes to the configuration database by which they are affected. In the context of the present example, the affected nodes may include the new node and one or more other nodes of the cluster from which certain responsibilities may be offloaded.

In one embodiment, the desired target state may be expressed in the form of a node's ownership/responsibility for one or more of a subset of slices in the slice file, a subset of data buckets (or bins), file system volumes (e.g., volume(s) 334), and/or logical aggregates. As noted above, the distribution of such responsibilities and functionality among the nodes of the cluster may seek to ensure efficient usage of the computing resources and storage capacity across the cluster as well as balancing of capacity utilization across the nodes of the cluster and maintaining data availability within the cluster. In some embodiments the balancing may be informed by a node rating scheme thought which a rating/score may be applied to individual nodes of the cluster and according to which the nodes may be ranked. A non-limiting of such a rating scheme may include determining an IOPS rating based on CPU and/or dynamic random access memory (DRAM) capacity of the respective node. The rating scheme may be predetermined and represented in the form of a table-based mapping of different combinations of CPU and DRAM capacity ranges to corresponding scores/ratings or alternatively may be calculated algorithmically on the fly.

At operation 570, the affected nodes react to the new target state. For example, in the context of FIGS. 4B-D, responsive to observing or being notified of the change in target state, new nodes (e.g., new nodes 407d-f) may pick up new responsibilities and existing nodes (e.g., nodes 407a-c) may let go of certain responsibilities. More specifically, new node 407d or 407e may take over responsibility for one or more file system volumes and/or logical aggregates from nodes 407b and/or 407c, and new nodes 407e or 407f may take over responsibility for slices and/or bins previously handled by nodes 407a and/or 407b.

While in the context of the various examples, a number of enumerated blocks are included, it is to be understood that such examples may include additional blocks before, after, and/or in between the enumerated blocks. Similarly, in some examples, one or more of the enumerated blocks may be omitted or performed in a different order.

Various components of the present embodiments described herein may include hardware, software, or a combination thereof. Accordingly, it may be understood that in other embodiments, any operation of the distributed storage system 100 in FIG. 1 or one or more of its components thereof may be implemented using a computing system via corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The various systems and subsystems (e.g., protocol subsystem, DMS 106, SMS 108, and cluster management subsystem 300, and/or nodes 107a-n (when represented in virtual form) of the distributed storage system described herein, and the processing described with reference to the flow diagram of FIG. 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 6 below.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Example Computer System

Figure 6:
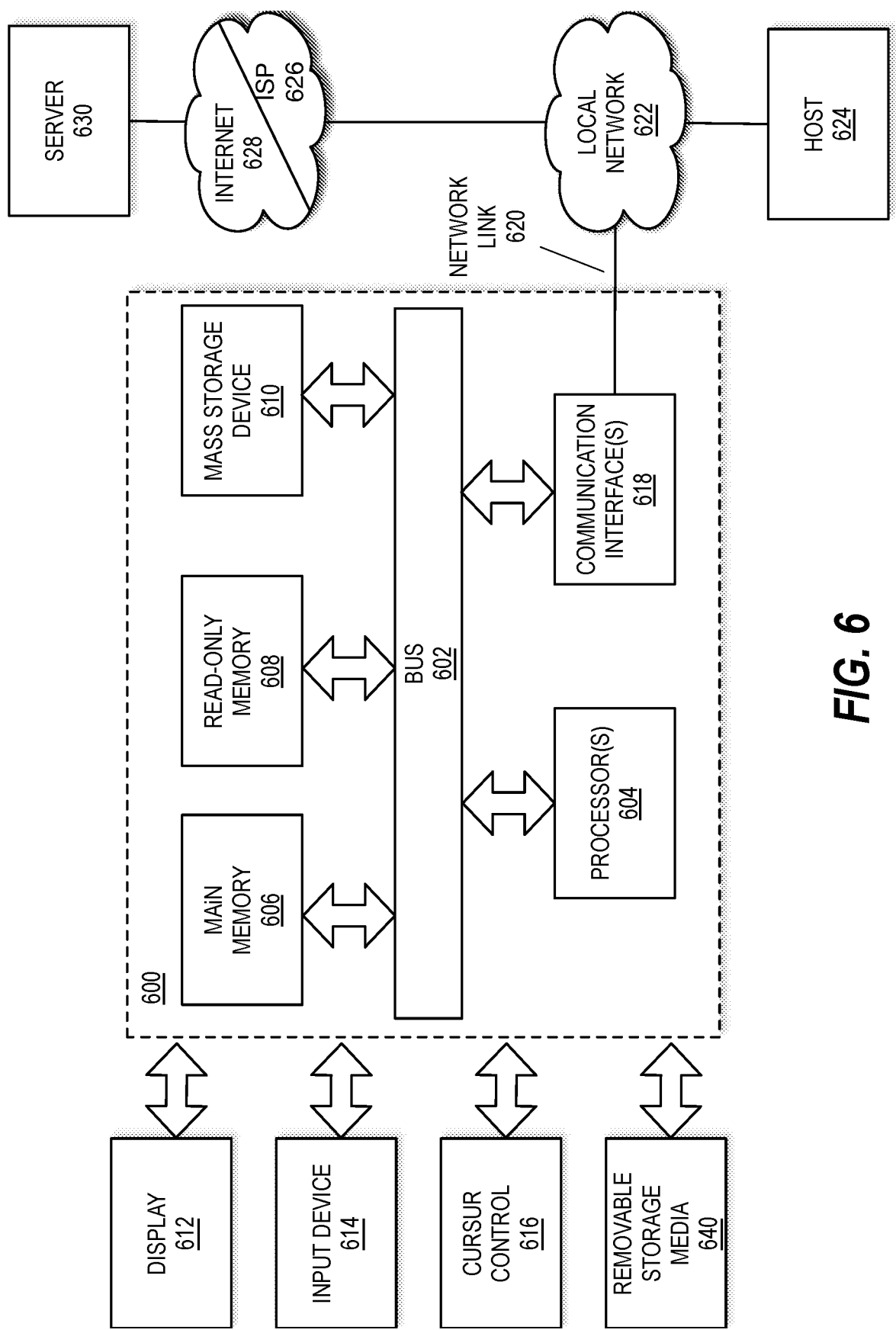
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may be representative of all or a portion of the computing resources associated with a node of nodes 107a-n of a distributed storage system (e.g., distributed storage system 100) or may be representative of all or a portion of a heterogeneous resource made available for use by the distributed storage system. Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine.

According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

Thus, the embodiments described herein provide a software-defined services-based architecture for a distributed storage system in which services can be selectively instantiated on the fly on new nodes as they become available for use by a distributed storage system based on the attributes/ characteristics/capacities (e.g., in terms of compute, memory, and/or storage) of the new nodes resources, thereby facilitating efficient utilization of heterogeneous resources to dynamically scale application and/or storage system functions.

Furthermore, the embodiments described herein provide a software-defined services-based architecture in which services can be started and stopped on demand (e.g., starting and stopping services on demand within each of the data management subsystem and the storage management subsystem). Each service manages one or more aspects of the distributed storage system as needed. The distributed storage system is architected to run on both shared nothing storage and shared storage architectures. The distributed storage system can leverage locally attached storage as well as network attached storage.

The disaggregation or decoupling of the data management and storage management subsystems enables deployment of the data management subsystem closer to the application (including, in some cases, on the application node) either as an executable or a statically or dynamically linked library (stateless). The decoupling of the data management and storage management subsystems allows scaling the data management layer along with the application (e.g., per the application needs such as, for example, multi-tenancy and/or QoS needs). In some embodiments, the data management subsystem may reside along with the storage management subsystem on the same node, while still being capable of operating separately or independently of the storage management subsystem. While the data management subsystem caters to application data lifecycle management, backup, disaster recovery, security and compliance, the storage management subsystem caters to storage-centric features such as, for example, but not limited to, block storage, resiliency, block sharing, compression/deduplication, cluster expansion, failure management, and auto healing.

Further, the decoupling of the data management subsystem and the storage management subsystem enables multiple personas for the distributed file system on a cluster. The distributed file system may have both a data management subsystem and a storage management subsystem deployed, may have only the data management subsystem deployed, or may have only the storage management subsystem deployed. Still further, the distributed storage system is a complete solution that can integrate with multiple protocols (e.g., NFS, SMB, iSCSI, S3, etc.), data mover solutions (e.g., snapmirror, copy-to-cloud), and tiering solutions (e.g., fabric pool).

The distributed file system enables scaling and load balancing via mapping of a file system volume managed by the data management subsystem to an underlying distributed block layer (e.g., comprised of multiple node block stores) managed by the storage management subsystem. A file system volume on one node may have its data blocks and metadata blocks distributed across multiple nodes within the distributed block layer. The distributed block layer, which can automatically and independently grow, provides automatic load balancing capabilities by, for example, relocating (without a data copy) of file system volumes and their corresponding objects in response to events that prompt load balancing. Further, the distributed file system can map multiple file system volumes to the underlying distributed block layer with the ability to service multiple I/O operations for the file system volumes in parallel.

The distributed file system described by the embodiments herein provides enhanced resiliency by leveraging a combination of block replication (e.g., for node failure) and RAID (e.g., for drive failures within a node). Still further, recovery of local drive failures may be optimized by rebuilding from RAID locally. Further, the distributed file system provides auto-healing capabilities. Still further, the file system data blocks and metadata blocks are mapped to a distributed key-value store that enables fast lookup of data In this manner, the distributed storage system described herein provides various capabilities that improve the performance and utility of the distributed storage system as compared to traditional data storage solutions. This distributed file system is further capable of servicing I/Os efficiently even with its multi-layered architecture. Improved performance is provided by reducing network transactions (or hops), reducing context switches in the I/O path, or both.

With respect to writes, the distributed file system may provide 1:1:1 mapping of a file system volume to a logical aggregate to a logical block device. This mapping enables colocation of the logical block device on the same node as the filesystem volume. Since the metadata object corresponding to the logical block device co-resides on the same node as the logical block device, the colocation of the filesystem volume and the logical block device enables colocation of the filesystem volume and the metadata object pertaining to the logical block device. Accordingly, this mapping enables local metadata updates during a write as compared to having to communicate remotely with another node in the cluster.

With respect to reads, the physical volume block number (pvbn) in the file system indirect blocks and buftree at the data management subsystem may be replaced with a block identifier. This type of replacement is enabled because of the 1:1 mapping between the file system volume and the logical aggregate (as described above) and further, the 1:1 mapping between the logical aggregate and the logical block device. This enables a data block of the logical aggregate to be a data block of the logical block device. Because a data block of the logical block device is identified by a block identifier, the block identifier (or the higher order bits of the block identifier) may be stored instead of the pvbn in the filesystem indirect blocks and buftree at the data management subsystem. Storing the block identifier in this manner enables a direct lookup of the block identifier from the file system layer of the data management subsystem instead of having to consult the metadata objects of the logical block device in the storage management subsystem. Thus, a crucial context switch is reduced in the IO path.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by a processing resource of a cluster including a plurality of nodes and collectively representing a distributed storage system cause the distributed storage system to:
    add a new node to the cluster from a heterogeneous resource pool available for use by the cluster;
    determine a resource capacity of the new node, including one or more of a storage resource capacity, a compute resource capacity, and a memory capacity associated with the new node;
    based on the resource capacity of the new node, dynamically establish a configuration of the new node, wherein the configuration is indicative of whether one or both of a new storage management subsystem (SMS) and a new data management subsystem (DMS) are to be enabled on the new node, wherein responsive to the storage capacity being sufficient to accommodate block and storage management services, the new SMS is established within the configuration, and wherein responsive to the compute resource capacity being sufficient to accommodate file and volume services, the new DMS is established within the configuration; and
    deploy, virtually, the new node in accordance with the configuration, wherein the new SMS and the new DMS are disaggregated from each other such that either the new SMS or the new DMS may operate independently within the new node or both the new SMS and the new DMS may operate within the new node.

2. The non-transitory machine readable medium of claim 1, wherein storage capacity sufficient to accommodate block and storage management services comprises an amount of storage capacity sufficient to form a file system aggregate.

3. The non-transitory machine readable medium of claim 1, wherein the instructions further cause the distributed storage system to initiate load balancing of responsibility for one or more of a set of one or more blocks, bins, or slices from an existing SMS of a node of the plurality of nodes to the new SMS of the new node.

4. The non-transitory machine readable medium of claim 1, wherein the instructions further cause the distributed storage system to initiate load balancing of responsibility for one or more file system volumes from an existing DMS of a node of the plurality of nodes to the new DMS of the new node.

5. The non-transitory machine readable medium of claim 1, wherein the new node is added to the heterogeneous resource pool in response to presence of a demand for an additional service provided by either the DMS or the SMS.

6. A method comprising:
    adding, by a cluster of a plurality of nodes representing a distributed storage system, a new node to the cluster from a heterogeneous resource pool available for use by the cluster;
    determining a resource capacity of the new node, including one or more of a storage resource capacity, a compute resource capacity, and a memory capacity associated with the new node;
    based on the resource capacity of the new node, dynamically establishing a configuration of the new node, wherein the configuration is indicative of whether one or both of a new storage management subsystem (SMS) and a new data management subsystem (DMS) are to be enabled on the new node, wherein responsive to the storage capacity being sufficient to accommodate block and storage management services, the new SMS is established within the configuration, and wherein responsive to the compute resource capacity being sufficient to accommodate file and volume services, the new DMS is established within the configuration; and
    deploying, virtually, the new node in accordance with the configuration, wherein the new SMS and the new DMS are disaggregated from each other such that either the new SMS or the new DMS may operate independently within the new node or both the new SMS and the new DMS may operate within the new node.

7. The method of claim 6, wherein storage capacity sufficient to accommodate block and storage management services comprises an amount of storage capacity sufficient to form a file system aggregate.

8. The method of claim 6, further comprising initiating load balancing of responsibility for one or more of a set of one or more blocks, bins, or slices from an existing SMS of a node of the plurality of nodes to the new SMS of the new node.

9. The method of claim 6, further comprising initiating load balancing of responsibility for one or more file system volumes from an existing DMS of a node of the plurality of nodes to the new DMS of the new node.

10. The method of claim 6, wherein the new node is added to the heterogeneous resource pool in response to presence of a demand for an additional service provided by either the DMS or the SMS.

11. A non-transitory machine readable medium storing instructions, which when executed by a processing resource of a cluster including a plurality of nodes and collectively representing a distributed storage system cause the distributed storage system to:
    after identifying existence of a new node within a heterogeneous resource pool available for use by the cluster, add the new node to the cluster;
    determine resource capacity associated with the new node;
    responsive to the new node having sufficient storage capacity to accommodate block and storage management services, enable a storage management subsystem (SMS) within a configuration of the new node;

responsive to the new node having sufficient compute capacity to accommodate file and volume services, enable a data management subsystem (DMS) within the configuration; and deploy, virtually, the new node in accordance with the configuration, wherein the SMS and the DMS are disaggregated from each other such that either the SMS or the DMS may operate independently within the new node or both the SMS and the DMS may operate within the new node, including:

provisioning the new node with a container including both the SMS and the DMS, wherein processes associated with one or more services associated with either or both of the SMS and the DMS are caused to be selectively launched based on the configuration; or based on the configuration, selectively provisioning the new node with one or more of (i) a first set of one or more containers including the SMS and (ii) a second set of one or more containers including the DMS.

12. The non-transitory machine readable medium of claim 11, wherein the new node comprises a new worker node of a container orchestration platform, a new VM, a new physical server, or a just a bunch of disks (JBOD) system.

13. The non-transitory machine readable medium of claim 11, wherein the new node is added to the heterogeneous resource pool in response to presence of a demand for an additional service provided by either the DMS or the SMS.

14. The non-transitory machine readable medium of claim 11, wherein the instructions further cause the distributed storage system to load balance a set of objects in a cluster database from one or more of the plurality of nodes to the new node.

15. The non-transitory machine readable medium of claim 14, wherein the set of objects include a logical block device, a corresponding logical aggregate, and a corresponding file system volume.

16. A method comprising:

after identifying existence of a new node within a heterogeneous resource pool available for use by a cluster of a plurality of nodes representing a distributed storage system, adding the new node to the cluster;

determining resource capacity associated with the new node;

responsive to the new node having sufficient storage capacity to accommodate block and storage management services, enabling a storage management subsystem (SMS) within a configuration of the new node;

responsive to the new node having sufficient compute capacity to accommodate file and volume services, enabling a data management subsystem (DMS) within the configuration; and deploying, virtually, the new node in accordance with the configuration, wherein the SMS and the DMS are disaggregated from each other such that either the SMS or the DMS may operate independently within the new node or both the SMS and the DMS may operate within the new node, including:

provisioning the new node with a container including both the SMS and the DMS, wherein processes associated with one or more services associated with either or both of the SMS and the DMS are caused to be selectively launched based on the configuration; or based on the configuration, selectively provisioning the new node with one or more of (i) a first set of one or more containers including the SMS and (ii) a second set of one or more containers including the DMS.

17. The method of claim 16, wherein the new node comprises a new worker node of a container orchestration platform, a new VM, a new physical server, or a just a bunch of disks (JBOD) system.

18. The method of claim 16, wherein the new node is added to the heterogeneous resource pool in response to presence of a demand for an additional service provided by either the DMS or the SMS.

19. The method of claim 16, further comprising load balancing a set of objects in a cluster database from one or more of the plurality of nodes to the new node.

20. The method of claim 19, wherein the set of objects include a logical block device, a corresponding logical aggregate, and a corresponding file system volume.

21. A non-transitory machine readable medium storing instructions, which when executed by a processing resource of a cluster including a plurality of nodes and collectively representing a distributed storage system cause the distributed storage system to:

add a new node to the cluster from a heterogeneous resource pool available for use by the cluster;

based on resource capacity of the new node, dynamically establish a configuration of the new node, wherein the configuration is indicative of whether one or both of a new storage management subsystem (SMS) and a new data management subsystem (DMS) are to be enabled on the new node; and deploy, virtually, the new node in accordance with the configuration, wherein the new SMS and the new DMS are disaggregated from each other such that either the new SMS or the new DMS may operate independently within the new node or both the new SMS and the new DMS may operate within the new node.

22. The non-transitory machine readable medium of claim 21, wherein the instructions further cause the distributed storage system to:

determine one or more of a storage resource capacity, a compute resource capacity, and a memory capacity associated with the new node;

based on the storage capacity being sufficient to accommodate block and storage management services, enable the new SMS within the configuration;

based on the compute resource capacity being sufficient to accommodate file and volume services, enable a new DMS within the configuration; and initiate load balancing of responsibility for one or more file system volumes from an existing DMS of a node of the plurality of nodes to the new DMS of the new node.

23. The non-transitory machine readable medium of claim 22, wherein storage capacity sufficient to accommodate block and storage management services comprises an amount of storage capacity sufficient to form a file system aggregate.

24. The non-transitory machine readable medium of claim 21, wherein the instructions further cause the distributed storage system to initiate load balancing of responsibility for one or more of a set of one or more blocks, bins, or slices from an existing SMS of a node of the plurality of nodes to the new SMS of the new node.

25. The non-transitory machine readable medium of claim 21, wherein the new node is added to the heterogeneous resource pool in response to presence of a demand for an additional service provided by either the DMS or the SMS.

26. A method comprising:
adding, by a cluster of a plurality of nodes representing a distributed storage system, a new node to the cluster from a heterogeneous resource pool available for use by the cluster;
based on resource capacity of the new node, dynamically establishing a configuration of the new node, wherein the configuration is indicative of whether one or both of a new storage management subsystem (SMS) and a new data management subsystem (DMS) are to be enabled on the new node;
deploying, virtually, the new node in accordance with the configuration, wherein the new SMS and the new DMS are disaggregated from each other such that either the new SMS or the new DMS may operate independently within the new node or both the new SMS and the new DMS may operate within the new node; and
initiating load balancing of responsibility for one or more file system volumes from an existing DMS of a node of the plurality of nodes to the new DMS of the new node.

27. The method of claim 26, further comprising:
determining one or more of a storage resource capacity, a compute resource capacity, and a memory capacity associated with the new node;
based on the storage capacity being sufficient to accommodate block and storage management services, enabling the new SMS within the configuration; and
based on to the compute resource capacity being sufficient to accommodate file and volume services, enabling a new DMS within the configuration.

28. The method of claim 27, wherein storage capacity sufficient to accommodate block and storage management services comprises an amount of storage capacity sufficient to form a file system aggregate.

29. The method of claim 26, further comprising initiating load balancing of responsibility for one or more of a set of one or more blocks, bins, or slices from an existing SMS of a node of the plurality of nodes to the new SMS of the new node.

30. The method of claim 26, wherein the new node is added to the heterogeneous resource pool in response to presence of a demand for an additional service provided by either the DMS or the SMS.

31. A non-transitory machine readable medium storing instructions, which when executed by a processing resource of a cluster including a plurality of nodes and collectively representing a distributed storage system cause the distributed storage system to:
after identifying existence of a new node within a heterogeneous resource pool available for use by the cluster, add the new node to the cluster;
determine resource capacity associated with the new node;
based on the new node having sufficient storage capacity to accommodate block and storage management services, enable a storage management subsystem (SMS) within a configuration of the new node;
based on the new node having sufficient compute capacity to accommodate file and volume services, enable a data management subsystem (DMS) within the configuration;
deploy, virtually, the new node in accordance with the configuration, wherein the SMS and the DMS are disaggregated from each other such that either the SMS or the DMS may operate independently within the new node or both the SMS and the DMS may operate within the new node; and
load balance a set of objects in a cluster database from one or more of the plurality of nodes to the new node.

32. The non-transitory machine readable medium of claim 31, wherein in connection with deployment of the new node the instructions further cause the distributed storage system to:
provision the new node with a container including both the SMS and the DMS; and
cause processes associated with one or more services associated with either or both of the SMS and the DMS to be selectively launched based on the configuration.

33. The non-transitory machine readable medium of claim 31, wherein in connection with deployment of the new node the instructions further cause the distributed storage system to based on the configuration, selectively provision the new node with one or more of (i) a first set of one or more containers including the SMS and (ii) a second set of one or more containers including the DMS.

34. The non-transitory machine readable medium of claim 31, wherein the new node comprises a new worker node of a container orchestration platform, a new VM, a new physical server, or a just a bunch of disks (JBOD) system.

35. The non-transitory machine readable medium of claim 31, wherein the new node is added to the heterogeneous resource pool in response to presence of a demand for an additional service provided by either the DMS or the SMS.

36. The non-transitory machine readable medium of claim 31, wherein the set of objects include a logical block device, a corresponding logical aggregate, and a corresponding file system volume.

37. A method comprising:
after identifying existence of a new node within a heterogeneous resource pool available for use by a cluster of a plurality of nodes representing a distributed storage system, adding the new node to the cluster;
determining resource capacity associated with the new node;
based on the new node having sufficient storage capacity to accommodate block and storage management services, enabling a storage management subsystem (SMS) within a configuration of the new node;
based on the new node having sufficient compute capacity to accommodate file and volume services, enabling a data management subsystem (DMS) within the configuration;
deploying, virtually, the new node in accordance with the configuration, wherein the SMS and the DMS are disaggregated from each other such that either the SMS or the DMS may operate independently within the new node or both the SMS and the DMS may operate within the new node; and
load balancing a set of objects in a cluster database from one or more of the plurality of nodes to the new node.

38. The method of claim 37, wherein said deploying further comprises:
provisioning the new node with a container including both the SMS and the DMS; and
causing processes associated with one or more services associated with either or both of the SMS and the DMS to be selectively launched based on the configuration.

39. The method of claim 37, wherein said deploying further comprises based on the configuration, selectively provisioning the new node with one or more of (i) a first set of one or more containers including the SMS and (ii) a second set of one or more containers including the DMS.

40. The method of claim 37, wherein the new node comprises a new worker node of a container orchestration platform, a new VM, a new physical server, or a just a bunch of disks (JBOD) system.

41. The method of claim 37, wherein the new node is added to the heterogeneous resource pool in response to presence of a demand for an additional service provided by either the DMS or the SMS.

42. The method of claim 37, wherein the set of objects include a logical block device, a corresponding logical aggregate, and a corresponding file system volume.

43. A non-transitory machine readable medium storing instructions, which when executed by a processing resource of a cluster including a plurality of nodes and collectively representing a distributed storage system cause the distributed storage system to:
- add a new node to the cluster from a heterogeneous resource pool available for use by the cluster,
- based on resource capacity of the new node, dynamically establish a configuration of the new node, wherein the configuration is indicative of whether one or both of a new storage management subsystem (SMS) and a new data management subsystem (DMS) are to be enabled on the new node; and
- deploy, virtually, the new node in accordance with the configuration, wherein the new SMS and the new DMS are disaggregated from each other such that either the new SMS or the new DMS may operate independently within the new node or both the new SMS and the new DMS may operate within the new node, wherein the new node is added to the heterogeneous resource pool in response to presence of a demand for an additional service provided by one or both of an SMS or a DMS.

44. A non-transitory machine readable medium storing instructions, which when executed by a processing resource of a cluster including a plurality of nodes and collectively representing a distributed storage system cause the distributed storage system to:
- after identifying existence of a new node within a heterogeneous resource pool available for use by the cluster, add the new node to the cluster;
- determine resource capacity associated with the new node;
- based on the new node having sufficient storage capacity to accommodate block and storage management services, enable a storage management subsystem (SMS) within a configuration of the new node;
- based on the new node having sufficient compute capacity to accommodate file and volume services, enable a data management subsystem (DMS) within the configuration;
- deploy, virtually, the new node in accordance with the configuration, wherein the SMS and the DMS are disaggregated from each other such that either the SMS or the DMS may operate independently within the new node or both the SMS and the DMS may operate within the new node, wherein the new node is added to the heterogeneous resource pool based on presence of a demand for an additional service provided by one or more of the DMS and the SMS.

* * * * *